(12) United States Patent
Miller et al.

(10) Patent No.: US 10,114,558 B2
(45) Date of Patent: Oct. 30, 2018

(54) INTEGRATED MAIN MEMORY AND COPROCESSOR WITH LOW LATENCY

(71) Applicant: MoSys, Inc., San Jose, CA (US)

(72) Inventors: Michael J. Miller, Saratoga, CA (US); Jay B Patel, Los Gatos, CA (US); Michael J Morrison, Sunnyvale, CA (US)

(73) Assignee: MOSYS, INC., San Jose, CA (US)

( * ) Notice: Subject to any disclaimer, the term of this patent is extended or adjusted under 35 U.S.C. 154(b) by 0 days.

(21) Appl. No.: 15/898,659

(22) Filed: Feb. 18, 2018

(65) Prior Publication Data

US 2018/0173433 A1 Jun. 21, 2018

Related U.S. Application Data

(63) Continuation of application No. 14/872,137, filed on Sep. 30, 2015, now Pat. No. 9,921,755, which is a (Continued)

(51) Int. Cl.
| | |
|---|---|
| *G06F 3/06* | (2006.01) |
| *G06F 9/38* | (2018.01) |
| *G06F 12/00* | (2006.01) |
| *H04L 29/12* | (2006.01) |
| *H04L 29/08* | (2006.01) |

(Continued)

(52) U.S. Cl.
CPC ............ *G06F 3/0611* (2013.01); *G06F 3/067* (2013.01); *G06F 3/0659* (2013.01); *G06F 9/3877* (2013.01); *G06F 12/00* (2013.01); *G06F 12/0875* (2013.01); *G06F 12/0895* (2013.01); *H04L 29/12* (2013.01); *H04L 67/1017* (2013.01); *H04L 67/2842* (2013.01); *G06F 2212/1024* (2013.01); *G06F 2212/452* (2013.01); *G06F 2212/604* (2013.01)

(58) Field of Classification Search
CPC ............................................ G06F 9/38–9/3897
See application file for complete search history.

(56) References Cited

U.S. PATENT DOCUMENTS

| | | | |
|---|---|---|---|
| 6,233,599 B1 * | 5/2001 | Nation ................ | G06F 9/30127 712/207 |
| 2004/0123296 A1 * | 6/2004 | Challenger ........... | G06F 9/5027 718/102 |
| 2009/0282197 A1 * | 11/2009 | Comparan ............ | G06F 12/126 711/142 |

* cited by examiner

*Primary Examiner* — Nicholas Simonetti

(57) ABSTRACT

System, method, and apparatus for integrated main memory (MM) and configurable coprocessor (CP) chip for processing subset of network functions. Chip supports external accesses to MM without additional latency from on-chip CP. On-chip memory scheduler resolves all bank conflicts and configurably load balances MM accesses. Instruction set and data on which the CP executes instructions are all disposed on-chip with no on-chip cache memory, thereby avoiding latency and coherency issues. Multiple independent and orthogonal threading domains used: a FIFO-based scheduling domain (SD) for the I/O; a multi-threaded processing domain for the CP. The CP is an array of independent, autonomous, unsequenced processing engines processing on-chip data tracked by SD of external CMD and reordered per FIFO CMD sequence before transmission. Paired I/O ports tied to unique global on-chip SD allow multiple external processors to slave chip and its resources independently and autonomously without scheduling between the external processors.

20 Claims, 13 Drawing Sheets

Related U.S. Application Data continuation of application No. PCT/IB2014/002903, filed on Dec. 31, 2014.

(60) Provisional application No. 61/922,693, filed on Dec. 31, 2013.

(51) Int. Cl.
*G06F 12/0875* (2016.01)
*G06F 12/0895* (2016.01)

| ROW | 1 SD IN (PFE) | 2 CMD (Access / CSUB) (PFE) | 3 MEM SCHED (MMCP) | 4 PE -THREAD (MMCP) | 5 INSTRUCTION SEQUENCE (1/cycle) (MMCP) | 6 Instructions execute on CYCLES (MMCP) | 7 SD OUT (MMCP) | 8 OUTPUT CMD QUEUE (MMCP) |
|---|---|---|---|---|---|---|---|---|
| -- | | (QUEUE FULL) | | | | | | |
| 1 | HH | EXACT MATCH | N/A | N/A | N/A | N/A | | N/A |
| 2 | | EXACT MATCH | -- | PE-2, THD-1/8 FF | hash, extract, main mem load, extract... | 2, 10, 18, 26, 34... | | EXACT MATCH |
| 3 | 1 | READ ACCESS | READ | -- | -- | -- GG | | READ ACCESS |
| 4 | | LPM | -- | PE-24, THD-5/8 | extract, extract, popcount, shift left, ... | 26, 34, 42, 58 ... | 1 | LPM |
| 5 | | *** | *** | *** | *** | *** | | *** |
| 6 | | READ | READ | -- | -- | -- | | READ |
| 7 | | WRITE (no ack) | WRITE | -- | -- | -- | JJ | (skip) |
| 8 | | *** | *** | *** | *** | *** | | *** |
| 9 | 2 | CMD X KK | -- | PE-5, THD-8/8 | Instr 1, Instr 2, Instr 3, Instr 4, | 5, 13, 25, 30, ..... | | CMD X |
| 10 | | EXACT MATCH | -- | PE-16, THD-2/2 MM | hash, hash, extract, main memory load, extract, ...... | 2,4,6,8,10, ... | 2 | EXACT MATCH |
| 11 | | CMD Z | -- | PE-8, THD 3/8 | Instr 15, Instr 16, Instr 17, Instr 18, ... | *** | | CMD Z |
| 12 | | RMW | RMW | -- | -- | -- | | RMW |
| 13 | 3 | *** | *** | *** | *** | *** | 3 | *** |
| 14 | | LPM | -- | PE-9, THD-6/8 | extract, extract, popcount, shift left, ..... | 22, 30, 38, 46, 54... | | LPM |
| 15 | | EXACT MATCH | -- | PE-18, THD-1/4 | hash, extract, main mem load, extract... | 3, 7, 11, 14 .... | | EXACT MATCH |
| 16 | | LPM | -- | PE-24, THD-5/8 | extract, extract, popcount, shift left, ... | 26, 34, 42, 50, 58... | | LPM |
| 17 | | EXACT MATCH | -- | PE-20, THD-1/4 | hash, extract, main mem load, extract... | 3, 7, 11, 14 .... | | EXACT MATCH |
| 18 | 4 | *** | *** | *** | *** | *** | 4 | *** |
| 19 | | EXACT MATCH | -- | PE-30, THD-8 LL | hash, hash, extract, main memory load, SYNC: SD1, CMD X... | 7, 15, 23, 31, 39 .... | | EXACT MATCH |
| 20 | | READ | READ | -- | -- | -- | | RMW |

INTEGRATED MAIN MEMORY AND COPROCESSOR WITH LOW LATENCY

CROSS-REFERENCE TO RELATED APPLICATIONS

This application is a continuation of and claims priority to: i) U.S. application Ser. No. 14/872,137, titled INTEGRATED MAIN MEMORY AND COPROCESSOR WITH LOW LATENCY, filed 2015 Sep. 30; ii) PCT International Application No. PCT/IB2014/002903, titled "INTEGRATED MAIN MEMORY AND COPROCESSOR WITH LOW LATENCY," having an international filing date of Dec. 31, 2014; and iii) U.S. Application Ser. No. 61/922,693 filed Dec. 31, 2013; titled "MEMORY CHIP WITH PROGRAMMABLE ENGINES," which applications are also incorporated by reference herein in their entirety.

These and all other referenced patents and applications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

FIELD OF TECHNOLOGY

This disclosure relates generally to the technical fields of integrated circuits, and in one example embodiment, this disclosure relates to a method, apparatus and system of network processing and memory storage.

BACKGROUND

A network processing unit (NPU), a.k.a. a packet forwarding engine (PFE), is a an integrated circuit (IC) designed and optimized for processing a network packet (packets) that contains header information composed of network address and protocol fields and a user data payload (the data unit at layer 3 of the open system interconnection (OSI) model). The PFE is tasked with performing functions on the header such as computation, pattern matching, manipulation of certain bits within the protocol fields, key lookup (for an internet protocol (IP) address) in a table, etc., for applications such as quality of service (QoS) enforcement, access control monitoring, packet forwarding, etc. in products such as routers, switches, firewalls, etc. found on a private network, e.g., a LAN, or on a public network, e.g., the Internet.

PFE packet processing rates currently exceed the tens of millions of packets per second (Mpps). Thus, a substantial amount of data has to be processed by the PFE. To cope with this high bandwidth requirement, PFEs utilize multiple-processing cores and multi-threading. The PFE stores data in, and fetches data from, off-chip memory such as dynamic random access memory (DRAM) chips. This off-chip memory is used to store data such as IP addresses for forward hops, traffic management statistics, QoS data, etc. The off-chip memory typically has a memory access controller (MAC) that performs simple operations such as reading data from memory and writing data to memory. Operations that are more sophisticated are typically performed by the PFE. Latency is incurred in any transfer of data to and from the PFE because of the processing time required to frame and transmit the data in a packet to and from the multiple chip interfaces. Pipelining helps to fill empty cycles, but latency still occurs.

Using a data cache and/or instruction cache on the PFE chip can help reduce latency in retrieving data or instructions from off-chip memory, by storing frequently used and prefetched data and instructions temporarily on-chip. A high-level cache, i.e., L1, is slaved to the on-die processor for the PFE. An on-die cache is not used as a main memory for storing a primary source of data from which resources other than the processor associated with the cache would then read. Latency is still incurred sending data back and forth between the on-die cache and off-chip memory. Because the data stored in the cache is a copy of the data stored in the off-chip memory, administrative overhead may be required to maintain coherency of data by synchronizing the copy of data stored in the cache versus the original data stored in one or more external memory devices, such as external buffer memory or external main memory. Sometimes an algorithm running on a PFE will repetitively fetch data stored on main memory for repetitive operations or frequent updates. If the cache has to be updated for each of these repetitive operations, then the fetch from external memory and the write back to external memory both incur latency.

Access throughput for many large data structures such as network address tables does not improve with data caches. The random nature of arriving packets from all points of the network, the fine grain nature of the actual data structure, and the sparse diffuse structure can make it difficult to hold enough of the data structure in the data cache at any one-time span to make a statistical improvement in performance. This is known as poor temporal locality quality of the data structure. Therefore, it is often better to reduce the latency to memory by reducing the physical and electrical distance between the processor and the actual copy of the data structure. Often it is infeasible to put the whole data structure in on-chip memory of the PFE. However, moving the data off chip brings back the latency problem.

If a chip has an onboard microprocessor or microcontroller, then many memory accesses to an on-chip memory are typically processed by the microprocessor or microcontroller first. Otherwise, a direct access to the on-chip memory by an external host might alter data in the on-chip memory on which the microprocessor or microcontroller relies. Additionally, if the microprocessor or microcontroller is configured primarily as a special function microprocessor or microcontroller that does not normally access data in the on-chip memory, then an override function may be necessary to enable that microprocessor or microcontroller to make a special memory access to the on-chip memory. This may require an interrupt to the memory controller in order to drop current and newly arriving external accesses during the time required for the special memory access to complete its operation.

A PFE can include a complex on-die processor capable of sophisticated functions. The operations required for packet processing can range from simple to complex. If a separate coprocessor chip is utilized on a line-card to offload less sophisticated operations from the PFE, then the coprocessor has the same latency while fetching and storing data to and from an off-chip memory. If the coprocessor has cache memory on die, then the same coherency overhead arises for synchronizing data between the on-die cache and off-chip memory. Moreover, if data from an external memory is shared between two or more other devices, e.g., a coprocessor cache and an NPU cache, then the complexity of the coherency can increase. Complex process signaling, mutual exclusion protocols or multi-processor modified-exclusiveshared-invalid (MESI) protocols have been developed to facilitate data sharing. Even with these solutions deadlock conditions can still occur.

A typical coprocessor is slaved to only one host in order to simplify accesses and commands from only one source. If more than one host were coupled to and communicating with a single coprocessor resource, then tracking and tracing of the source of a command would be required in order to return the data to the correct requestor. If the shared coprocessor resource has multi-threading capability for one or all of the multiple hosts coupled to it, then the overhead in managing the threads can be substantial.

Creating a memory coprocessor with fixed specialized abstract operations for a specific application can make the market too narrow, thus making the product less economically feasible.

The same design and application concerns mentioned herein also arise for processors other than network processors. For example, general-purpose graphics processor units (GPGPUs), multi-core workstation processors, video game consoles, and workstations for computational fluid dynamics, finite element modeling, weather modeling, etc. would involve similar concerns.

SUMMARY

An apparatus, method, and system for providing an integrated main memory (MM) and coprocessor (CP) chip (MMCC). The chip is a main memory because it has sufficient capacity that it does not cache data therein from off-chip resources, i.e., an off-chip memory. Thus, the chip avoids coherency and poor temporal locality issues associated with caching data. The chip supports traditional external access like a discrete main memory chip. This is done without adding latency from the CP during the memory access. In particular, the present disclosure does not require the external access to MM to be processed first by the CP. Additionally, the chip performs local on-chip processing of local data stored in the MM and data received with the command (CMD) without having to cross multiple discrete chip interfaces in order to fetch data from off-chip sources. This reduces power, latency, and host bandwidth consumption. In addition, it isolates the data from cross-process interference. Similarly, the chip supports subroutine call (CSUB) code executed by the CP on-chip, to implement higher level abstract data structure operations and does not cache instructions from an off-chip memory, thereby avoiding additional latency for extern memory fetches to perform cache fills. The coprocessor (CP) is programmable for performing subroutine calls (CSUBs) defined by a user on data that is stored in MM or received with a CMD. The chip is a highly efficient niche solution for frequently processed, short to moderate length CSUB code on high-value data requiring low latency. The coprocessor interface provides a well-ordered interface to control access and isolate the underlying nature of the data from higher-level PFE tasks.

In one embodiment, the apparatus includes a main memory (MM) that is accessible independently of the coprocessor, and that interleavedly processes both external access calls by a host and internal access calls by the CP. The internal access call does not require an interrupt of external access calls to access MM. Rather, the internal access calls can be load balanced to have a higher/lower/same priority as an external access call. The internal access call has substantially less latency, e.g., up to three orders of magnitude fewer cycles, than an external access call. This is because the internal access call bypasses the chip interface (I/F), such as SerDes, which incurs latency by having to receive, recover, decode, deserialize, and drive the data to the main memory. On a higher level, if a data fetch is being scheduled by a discrete processor/coprocessor (PFE) chip from a discrete and separate main memory chip, then the repeated trips, i.e. recursive operations, that the data has to make between multiple chip interfaces compounds the latency, including the operations of encoding, packetizing, serializing, and transmitting side of the interface. If the processor/coprocessor is also responsible for managing the conflict avoidance in scheduling a data fetch, then this consumes valuable processor bandwidth while tasks that are more sophisticated wait. Additionally, driving large quantities of data over external lines, which are longer than an internal chip path, consumes power and subjects the data to noise. The MM is partitioned in one embodiment to provide pipelined throughput at a memory clock (CLK) speed that is inversely proportional to a system CLK speed, according to a quantity of memory partitions.

The CP is comprised of one or more discrete, autonomous processing engines (PEs) having a fine-grained processor multi-threaded (PMT) (1 cycle/thread) configuration. The PE threading is orthogonal and independent of the scheduling domain thread (SDT) of the I/O. A CSUB CMD to the CP is associated with an I/O scheduling domain (SD) to ensure FIFO processing vis-à-vis all other CMDs received by the chip. Thus, if three CSUB CMDs are received followed by two memory access CMDS for a given SDT, then the output from the MMCC will be the three CSUB CMD output results followed by the two memory access results, assuming each of these CMDS required data to be returned to the host. Each PE is independent and autonomous from any other PE. Each PE executes a local CSUB code for each of up to eight processing threads, in the current embodiment, and relies on the output interface of the chip to reorder the results per the SDT. Thus, a processing sequence of CSUB code, or steps therein, can be of any sequence that utilizes the PEs most optimally, e.g., highest duty cycle, fastest throughput, best hierarchical priority processing, etc.

The MM and the CP perform their respective functions of memory accesses and subroutine calls independently and concurrently with each other by: i) using partitioned and/or redundant resources; ii) using queues to load balance and/or prioritize the execution of tasks on these resources, such as the tasks of accessing data, executing CSUB code, storing of data, and the transmitting of results; and iii) using a coarsely grained SDT reference to track CMDs and data through the chip. For example, the MM performs traditional native functions such as read, write, read-modify-write (RMW), etc., while the CP can be configured to perform extensible functions using exemplary CSUB code such as exact match, longest prefix match (LPM), search, etc. that are tailored for the specific application of networking in the present embodiment. Similarly, other subroutine functions for other applications such as a rendering function for a graphics application, etc. can be utilized with the present disclosure. The CP includes a local instruction memory (LIM) for storing the subroutines comprised a sequence of instructions chosen from an instruction set architecture (ISA) having instructions such as, hashing, mask-plus-count (MPC), set-assign-compare (SAC), error detection and correction (EDC), etc. The ISA contains the building blocks of executable instructions from which third parties can create novel, efficient, and differentiated algorithms for a given application. These algorithms are loaded into the LIM of the CP for execution on the PEs. The instructions, subroutines, and overall computing power of the MMCC is a secondary to a more powerful set of instructions, subroutines, and computing power of a host, to which the chip is slaved.

The present disclosures construction of a monolithic memory with coprocessor chip having higher level abstract operations to access and modify the data in the structure makes it possible to better isolate and control the integrity of the data while providing higher throughput. The isolation is similar or analogous to the isolation provided by modern object oriented languages like C++, Python, etc. whereby data structures can be created with their own access methods. The coprocessor arrangement allows the device to have a slave style communication that provides a well-ordered handoff of control at the hardware level. This solution overcomes deadlock limitations that exist in alternative computing methods such as complex process signaling, mutual exclusion protocols or multi-processor modified-exclusive-shared-invalid (MESI) protocols, which have been developed to facilitate data sharing. These generalized data manipulation solutions do not take into account the specific structure of the data and thus miss the opportunity to take advantage of optimizations inherent in the data structure.

The input interface to the MMCC communicates an external CMD received at its input interface to: i) the MM and the CP in parallel so that either can immediately start processing the CMD if they recognize it; and ii) a re-order buffer (ROB) that mirrors the sequence of incoming CMDs in order to effectuate a first-in-first-out (FIFO) protocol for the chip, for both memory access and subroutine calls. An input buffer partitioned per the SDTs will store the CMDs and the incoming data associated with the CMD in an input buffer according to the SDT. The input interface and the output interface interleavedly process access CMDs to MM and CSUB CMDs to the CP.

In another embodiment, the MM includes an on-chip memory scheduler (MS) that resolves all bank conflicts locally, i.e., without requiring a host to consume its valuable processing bandwidth managing mundane bank conflicts. The external access calls to the MMCC are queued per the SDT assigned to them by the host, while internal access calls from the CP are queued in a separate buffer per the SDT from their initial CMD received at the MMCC. A FIFO protocol is implemented in any granularity and priority desired, such as globally across all internal and external accesses, external accesses across all SDTs, external accesses of individual SDTs with round robin across multiple SDTs, internal accesses highest priority or weighted versus external accesses, etc.

The array of PEs can be flat or can be hierarchically organized into PE clusters (PECs), with one embodiment having four PEs per cluster and eight clusters per chip for a total of 32 PEs, though any hierarchy and quantity can be used. Each PE includes a local instruction memory (LIM) that is slaved to each PE for minimal latency. The CSUB code architecture supports branches and jumps but does not support an interrupts or cache control instructions. This is because the LIM is required to have all the CSUB code for which it supports (either a full set or a subset) loaded therein. Thus, the LIM does not perform cache fetches to retrieve \instructions stored in an off-chip memory. By focusing on an application-specific subset of subroutines, i.e., memory-centric network functions for the present embodiment, the CP benefits from fast, uninterrupted, and guaranteed processing of data at the expense of a limited CSUB code size. A CSUB code superset that is sufficiently small can be implemented by loading the entire superset in all the PEs' LIMs. A large CSUB code superset that exceeds the size restriction of the LIM can be split into multiple CSUB code subsets that are assigned to multiple different PEs, which when taken together fulfill the CSUB code superset. Similar to the LIM, a local data memory (LDM) is slaved to each PEC, or alternatively to each PE, in order to provide a lowest latency for frequently used master data stored only in the LDM and not in the MM and not in off-chip memory. An access by a PE to the LDM within its PEC is the fastest access, with an access to an LDM outside its PEC being second fastest, and an access to the MM being the slowest on-chip access of data memory. Because all data processed by the PEs are on-chip, the overhead and complexity of cache fills and spills are not needed to retrieve/send data from/to off-chip memory. Furthermore, because there is no dependence upon the statistical performance characteristics of a cache, performance is very predictable.

Each PE will execute CSUBs assigned to it from one or more external CMDs. Upon receipt of a plurality of CSUBs CMDS at the input interface of the MMCC, an aggregator in the CP will classify the CSUB CMDs according to a type of the CSUB CMD, e.g., the opcode. The rules for the type classification of a CSUB CMD are defined by the user/host, thus giving them flexibility in optimizing the PEs on the chip to the user's specific application. A creative user can implement special coding of CSUB CMDs, etc. to provide for high-priority urgent tasks vs. low-priority bulk tasks, and any desired synchronizing between the two. Once a CSUB CMD has been classified according to its CSUB type, a single allocator will allocate the CSUB CMD to a PE assigned to that type of CSUB CMDs, when a thread of an eligible PE becomes available. Note that the PE can perform all functions if it has the entire instruction set loaded in its LIM. If the entire CSUB code superset cannot be loaded into a PE's LIM, then the aggregator will map which PEs can perform which CSUB CMD opcodes, and will assign the CSUB CMD to the appropriate PE with that CSUB code subset. The PE is limited primarily by the user-defined allocation of the PE to a given type of CSUB CMD, or by the CSUB code subset loaded into a given PE, as desired and configured by a user. For example, a user can define a high-priority LPM as one CSUB opcode, and define a low-priority LPM a different CSUB opcode. The user can then either assign more PE resources to the high-priority CSUB opcode, or simply call the high-priority CSUB code less frequently, with either choice or both together effectively providing a high resource-to-usage ratio.

The CP is reconfigurable on the fly during field operation of the MMCC. This is implemented by the allocator: ceasing to accept subsequent given CMDS for a given PE; rerouting incoming given CMDs to a secondary source PE with the same CMD capability; emptying the given PE's queue by allowing the given PE to process its existing threads to completion; performing an overwrite operation on the LIM of the given PE with updated instructions received from a host; writing the new CSUB opcode into a map table of the allocator; and finally, by starting to accept CMDs for the updated or new CSUB.

The ROB includes a command queue output buffer (CQOB) and a data output buffer (DOB) that are partitioned per the SD and are tied to each other per the SDT. If an external CMD to access to MM or execute a CSUB CMD on the CP requires output data, then the CMD is written into the CQOB of the ROB, and a respective portion of DOB is reserved and tied to the given CMD in the CQOB. If a size of the respective portion of the DOB needed for a given CMD output is unknown, then writing output data to the DOB from subsequent CMDs is stalled, even if those subsequent CMDs know the size of DOB needed for their output data. This is done to guarantee sufficient memory in the DOB for the given CMD in order to preserve the FIFO protocol.

In a system environment, a single MMCC can be slaved to a plurality of PFEs, without requiring the PFEs to schedule or coordinate between themselves for the MM or CP resources on the MMCC. Each of a plurality of I/O port pairs is uniquely coupled to each of the plurality of PFEs. Then CMDS from each PFE are processed according to its port pair, whose integrity and tracking is maintained inside the chip by associating CMD and data received from each PFE according to their SDT which is globally assigned considering all ports on the chip, and thus, unique within the chip.

The MM portion of die area in the present embodiment is approximately 66%; with approximately 33% of the MM portion dedicated to the memory cell array itself. The resulting net MM portion of die area comprising purely memory cells is approximately 15-25% or more of the die area Another embodiment of the MMCC is a multi-chip module (MCM) comprising: i) the MMCC described above; ii) a high-bandwidth memory (HBM) chip for expanded memory capacity; and/or iii) a FLASH non-volatile memory (NVM) chip for permanent storage of data such as subroutine instructions. Alternatively, multiple MMCCs can be stacked together with a common bus running through the depth of the chip to provide through-silicon vias (TSVs) for expanding the memory capacity or CP processing capability.

The MMCC is a heterogeneous combination of various types of memory and logic on a monolithic device including embedded DRAM (eDRAM), SRAM, eFUSE, and high-speed logic. When considering a MCM, the heterogeneous memory combination is expanded to include FLASH NVM.

The present disclosure provides a chip with a degree of extensibility and programmability that allows the device to address multiple markets, thus amortizing the product development and support cost.

The methods, operations, processes, systems, and apparatuses disclosed herein may be implemented in any means for achieving various aspects, and may be executed in a form of a machine-readable medium, and/or a machine accessible medium, embodying a set of instructions that, when executed by a machine or a data processing system (e.g., a computer system), in one or more different sequences, cause the machine to perform any of the operations disclosed herein. Other features will be apparent from the accompanying drawings and from the detailed description that follows. Accordingly, the specification and drawings are to be regarded in an illustrative rather than a restrictive sense.

BRIEF DESCRIPTION OF THE VIEW OF DRAWINGS

Example embodiments are illustrated by way of example and not limitation in the figures of the accompanying drawings, in which like references indicate similar elements and in which:

FIG. 9 is a case table illustrating an I/O scheduling domain and the PE multi-threaded domain for a single port, according to one or more embodiments.

Figure 1:
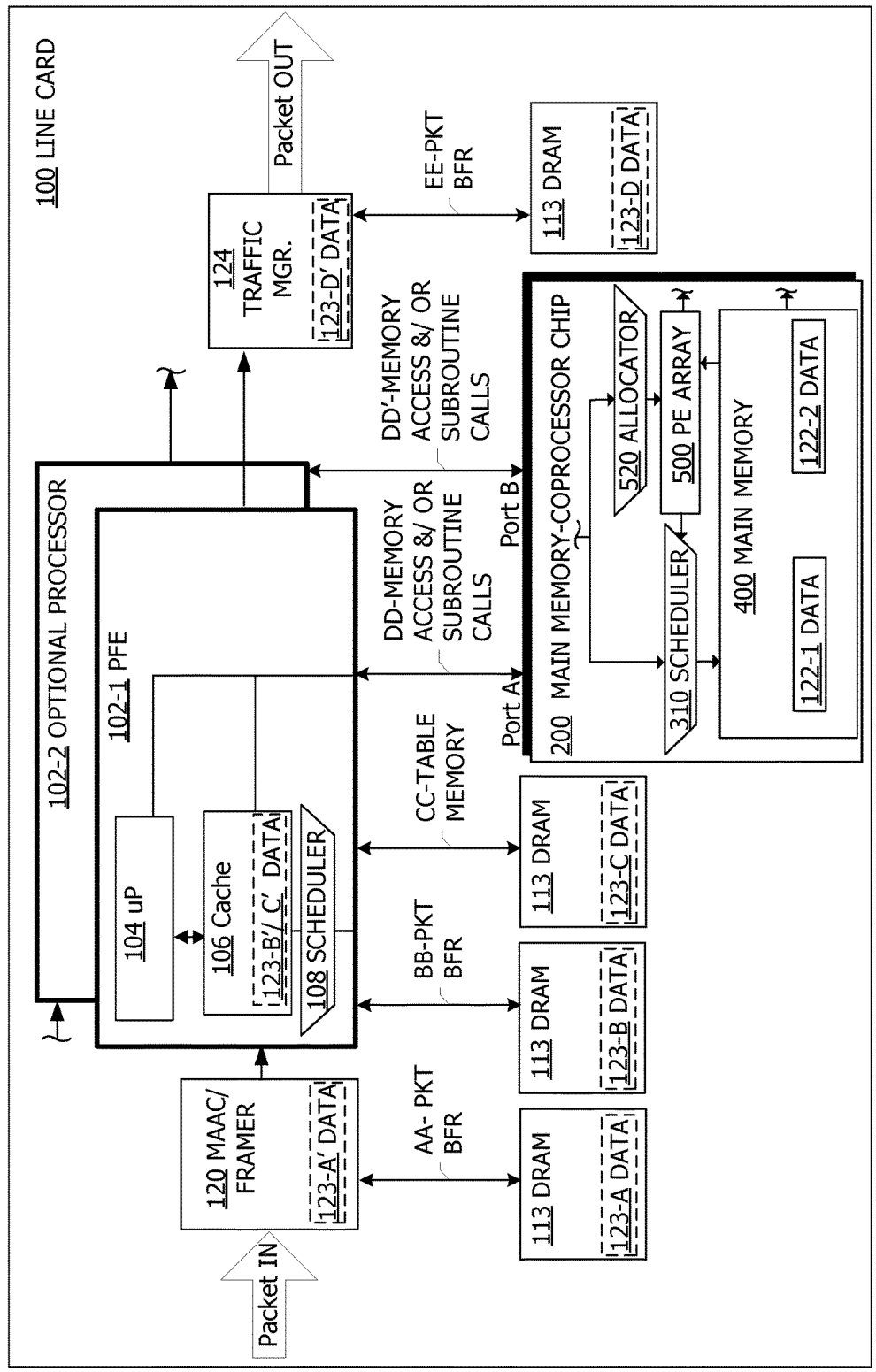
FIG. 1 is a functional block diagram of a line card in a network system, according to one or more embodiments.

Other features of the present embodiments will be apparent from the accompanying drawings and from the detailed description that follows.

DETAILED DESCRIPTION

A method, apparatus and system of System, method, and apparatus for an integrated main memory (MM) and configurable coprocessor (CP) chip for processing subset of network functions is disclosed. In the following description, for the purposes of explanation, numerous specific details are set forth in order to provide a thorough understanding of the various embodiments. It will be evident, however to one skilled in the art that various embodiments may be practiced without these specific details.

List of Acronyms Used in Description (Plural Adds Lowercase s, es)

CMD . . . command
CP . . . coprocessor
CQOB . . . command queue output buffer
CSUB . . . subroutine call
DOB . . . data output buffer
EDC . . . error detection and correction
FIFO . . . first-in-first-out
I/O . . . input/output
IC . . . integrated circuit
IM . . . instruction memory
ISA . . . instruction set architecture
LDM . . . local data memory LIM . . . local instruction memory
MAAC . . . media access controller
MAC . . . memory access controller
MM . . . main memory
MMCC . . . MM and CP chip
MPC . . . mask plus count
MS . . . memory scheduler
NPU . . . network processing unit
PE . . . processing engine
PEC . . . processing engine cluster
PFE . . . packet forwarding engine
ROB . . . reorder buffer
SAC . . . set assign compare
SD . . . scheduling domain
SDT . . . scheduling domain thread
uP . . . microprocessor Functional Block Diagram Referring now to FIG. 1, a functional block diagram is shown of a line card 100 in a network system, according to one or more embodiments. The line card 100 includes a packet forwarding engine (PFE) 102-1 and an optional processor 102-2 coupled in parallel to manage different portions of the network traffic. Optional processor 102-2 can be a network processing unit, a special function processor, or a co-processor. The PFE 102-1 and optional processor 102-2 process network packets, e.g., Internet packets, for routing, security, and other management functions. This is a task that consumes a substantial amount of processing bandwidth to accommodate high traffic rates of packets. The PFE 102-1 and optional processor 102-2 can be a field programmable gate array (FPGA), an application specific integrated circuit (ASIC), or an application specific standard product (ASSP), etc., that operates on all types of private and public networks, such as a LAN, WAN, SAN, VPN, etc., within a company and out to the public Internet.

The PFE 102-1 includes a microprocessor (uP) 104 coupled to a memory cache block 106 of random access memory (RAM), for storing instructions or data temporarily on the die of the PFE 102-1 for quicker access than off-chip memory storage, i.e. DRAM 113. Scheduler 108 manages access calls to DRAM 113 to avoid a conflict, while accessing DRAM 113, e.g., simultaneously accessing a same memory bank, per rules established by the DRAM designer. The scheduler 108 adds latency to the packet processing functions of PFE 102-1 by requiring PFE 102-1 to generate access fetches to off-chip memory, including the resolution of conflicts therein.

The media access controller (MAAC) and framer 120, process network packets coming into the line card 100 to ensure proper packaging of control and data portions of the packet. The PFE 102-1 and optional processor 102-2 then perform the network management functions on the network packet, followed by a traffic manager (TM) block 124, which regulates the output of packets from the line card to match the network capabilities.

Commodity DRAM 113 is utilized liberally in the line card 100 for packet buffering purposes. For example, when different blocks in the pipeline reach their capacity and stop accepting packets from an upstream block, upstream packets are frequently buffered by off-chip DRAM 113. Moving data back and forth from DRAM 113 is illustrated as paths AA, BB, CC, and EE. Data is moved from dashed memory locations 123-A, -B, -C, and -D in DRAM 113 to memory locations 123-A', B'/C', and D' (prime) in the functional block, MAC/framer 120, PFE 120-1, and TM 124, respectively. A substantial amount of power is consumed moving data back and forth from DRAM. Consequently, any reduction in caching or buffering will help reduce line card power demand.

One DRAM 113 is slated for storing control data 123-C in a table format to be communicated back and forth to PFE 102-1 via link CC, to store cache versions of this control data, shown as dashed block 123-C' (prime), in cache memory block 106 of PFE 102-1. While the DRAM 113 storage of table data 123-C is more sophisticated than that of the balance of the DRAMs 113 that simply buffer packets, having to move any data back and forth between DRAM 113 and PFE 102-1 still potentially adds latency to the pipeline. Specifically, the latency arises by requiring PFE 102-1 to schedule access calls, by requiring DRAM 113 to read the data 123-C, by requiring cache 106 to store data 123-C', and by requiring uP 104 and/or scheduler 108 to resolve any conflicts in the memory fetch from DRAM 113 any to resolve any coherency issues between the two versions of data 123-C and 123-C'.

The main memory/coprocessor (MMCC) chip 200, a monolithic device, includes a scheduler 310 coupled to a processor engine (PE) array 500, also referred to as a PE complex, and to a large block of main memory 400. PE array 500 provides processing resources to perform a set of CSUB code and functions on data 122-1 and 122-2 stored in MM 400. By performing the set of subroutines and functions locally on data stored in its main memory 400, the MMCC 200 will: i) eliminate transit time and reduce power consumption otherwise required to send the data back to the processors 102-1, and 102-2; and ii) increase uP 104 bandwidth for other networking tasks by not requiring it to perform subroutines that the PE array 500 can perform.

Data blocks 122-1 and 122-2 in MMCC 200 are not dashed in the illustration because they are data solely stored in MM 400 as the master version of a given type or range of data. In comparison, DRAM 113 stores data temporarily, which is illustrated as dashed blocks of data 123-A, -B, -C, and D. While PFE 102-1 and optional processor 102-2 can access data in MM 400 for specific purposes, they do not access large chunks of data transfer back and forth between themselves and MM 400, except for populating MM 400 at initialization of MMCC 200 or line card 100. Thus, MMCC 200 eliminates power otherwise required for transferring large blocks of data back and forth to processor(s) 102-1 and 102-2. Additionally, MMCC 200 eliminates coherency problems that would otherwise arise from having multiple versions of data disposed on separate chips.

Additionally, the two exemplary instances of data 122-1 and 122-2 on a single MMCC chip 200 can be managed by MMCC 200 for two separate users, i.e., processors, 102-1 and 102-2, respectively. This sharing of resources, from both MM 400 and PE array 500 resources on MMCC 200 to multiple processors 102-1 and 102-2, is performed seamlessly and transparently without requiring the multiple processors 102-1 and 102-2 to coordinate between themselves to avoid conflicts while accessing said shared resources. This is accomplished by slaving the MMCC 200 to the two processors via different ports. Namely, MMCC 200 is slaved to PFE 102-1 via port A with I/O serial lanes DD and is slaved to optional processor 102-2 via port B with I/O serial lanes DD'. The task of tracking commands and data from the multiple processors 102-1, and 102-2, is performed by MMCC 200 via tagging the data and commands with a scheduling domain thread, as described in subsequent figures and flowcharts.

As an example, PFE 102-1 can issue a string of access commands to MM 400, including optional memory partition location of data, without having to spend uP 104 bandwidth resolving any possible bank conflicts in MM 400. Additionally, PFE 102-1 can interleave the string of access commands with a plurality of network-related subroutine calls to PE array 500, such as a longest prefix match (LPM) on an IP addresses. In parallel with these commands from PFE 102-1 to MMCC 200, the optional processor 102-2 can also be communicating access commands and subroutine commands to MM 400 and PE array 500 of MMCC 200, without coordinating those commands with the first processor PFE 102-1. Thus, MMCC 200 provides an efficient solution to reducing the high processing demands on the PFE 102-1, while reducing latency of the pipelined processing of data packets on line card 100, and reducing power and latency otherwise required by transferring data back and forth to the cache 106 of PFE 102-1.

While the quantity of ports on MMCC 200 in the present embodiment is two (ports A and B), any quantity of ports can be used, with the quantity of ports equal to the quantity of external processors that MMCC 200 can support independently. Thus, a two port MMCC 200 with eight total SDs can independently support two external processors evenly with four SDs per external processor or port. The quantity of SDs can be scaled to any quantity of ports for a different MMCC design. For example, an MMCC with four ports, not shown, and 12 scheduling domains could be linked to four separate external processor chips, with three scheduling domains per external processor.

Figure 2:
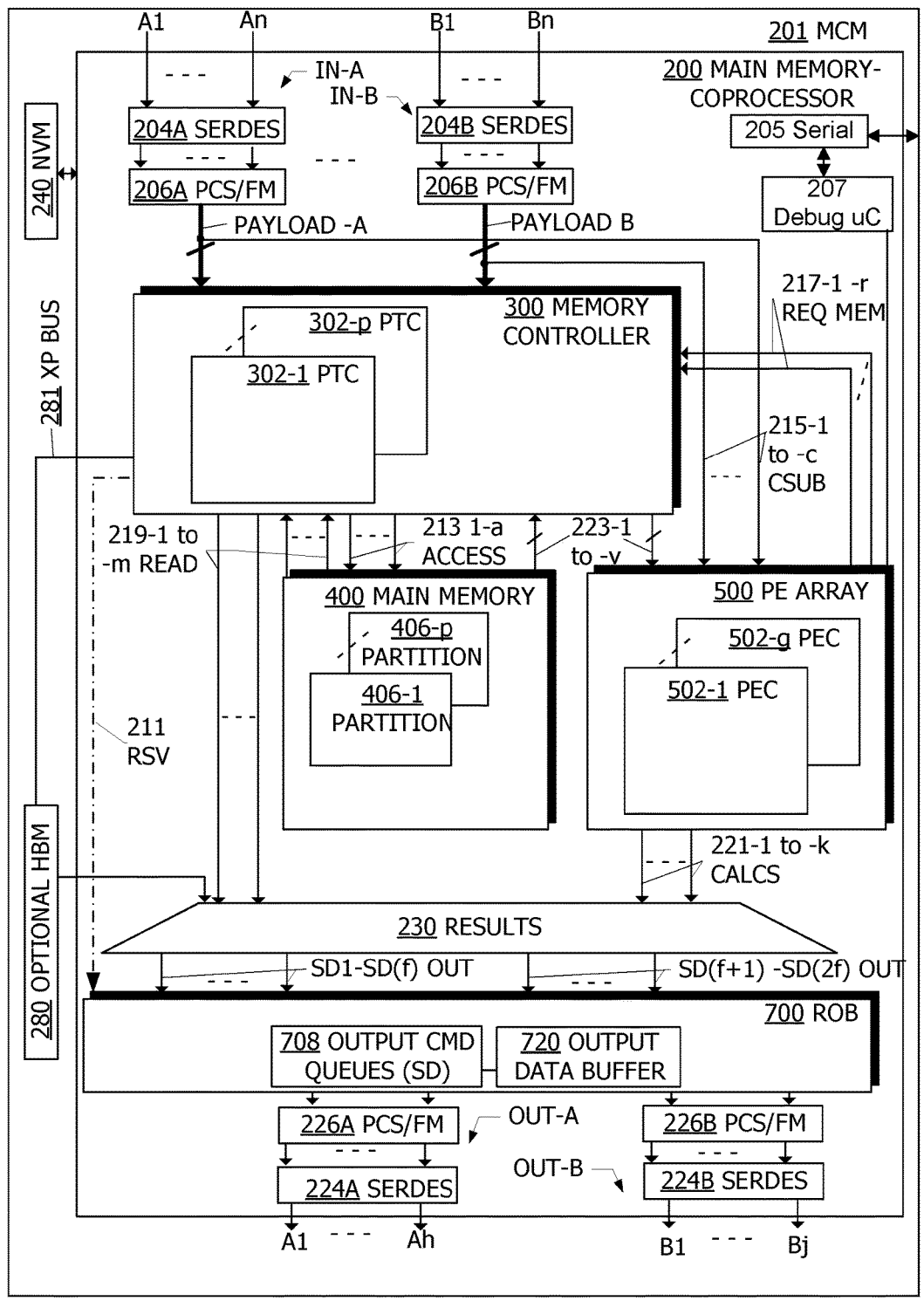
FIG. 2 is a functional block diagram of a multi-chip module (MCM) comprising an integrated main memory and coprocessor chip (MMCC) with low latency, a flash memory chip, and a high-bandwidth memory (HBM) chip, according to one or more embodiments.

Referring now to FIG. 2, a functional block diagram is shown of a multi-chip module (MCM) 201 comprising an integrated main memory and coprocessor chip (MMCC) 200 with low latency, a non-volatile memory (NVM) chip 240, and a high-bandwidth memory (HBM) chip 280, according to one or more embodiments.

The MMCC 200 includes two ports, A and B, shown as IN-A and IN-B, with serial lanes A1-An and B1-Bn, where n can be any quantity of lanes, but is eight in the present embodiment. Input ports IN-A and IN-B are coupled to a SerDes input interface 204A and 204B that are in turn coupled to the physical coding sublayer (PCS)/framer (FM) blocks 206A and 206B, respectively. Outputs from PCS/FM 206A, 206B are communicated via lines that communicate payload A and payload B from port A and port B, respectively, into memory controller 300 and PE array 500, where f is the number of scheduling domains per port, and is a global value. In the present embodiment, f=4 scheduling domains (SD) per port, with SD 1-4 assigned to port A, and SD 5-8 assigned to port B. The memory controller 300 will decode the respective scheduling domains associated with each of the CMDs.

Memory controller 300 includes a plurality of partition controllers 302-1 to 302-$p$, where p is any quantity of partitions and associated partition controllers, slated one per memory partition in the present embodiment. MM 400 is comprised of a plurality of portioned memory blocks 406-1 to 406-$p$, where p is any value, but p=4 for the present embodiment. PE array 500 is comprised of a plurality of PECs 502-1 to 502-$g$, where g is any number as required for computational needs, but g=8 for the present embodiment.

The memory controller 300 and PE array 500 are parallelly coupled to the input interface, namely PCS/FM 206A, 206B, in order to parallely receive CMDs arriving on input ports A and B. Additionally, reserve line 211 (RSV) communicates the sequence of CMDs and their respective SDs received at the memory controller 300 to the reorder buffer (ROB) 700 output port OUT-A, OUT-B, to ensure a first-in-first-out (FIFO) processing of data into and out of MMCC 200. The PE array 500 ignores memory access CMDs and processes only CSUB CMDs arriving on lines 215-1 to 215-$c$, where c is any bus width. Memory controller 300 ignores subroutine CMDs and processes only memory access CMDs. The Memory controller 300 is coupled to both optional HBM 280 and MM 400 in parallel in order to control accesses to both. In particular, memory controller 300 is coupled to MM 400 via lines 213-1 to 213-$a$, where a is any bus width, to each memory partition 406-1 to 406-$p$ considering the number of access requests, and a=8 in the present embodiment for 4 read and 4 writes. PE array 500 is coupled via lines 217-1 to 217-$r$ to communicate memory access requests from PE array 500 to memory controller 300 while bypassing the input interface, 204-A to -B. This direct access by MMCC 200 saves up to three orders of magnitude of cycles required for accessing data in MM 400. As compared to a PFE 102-1 of FIG. 1 requesting multiple iterations of data from DRAM 113, the on-die PE array 500 can make the same iterative fetches of data from on-die MM 400, perform the subroutine functions on that data and save the output data back to memory, with the latency savings being multiplied by the number of iterations required for a given CMD.

Figure 5A:
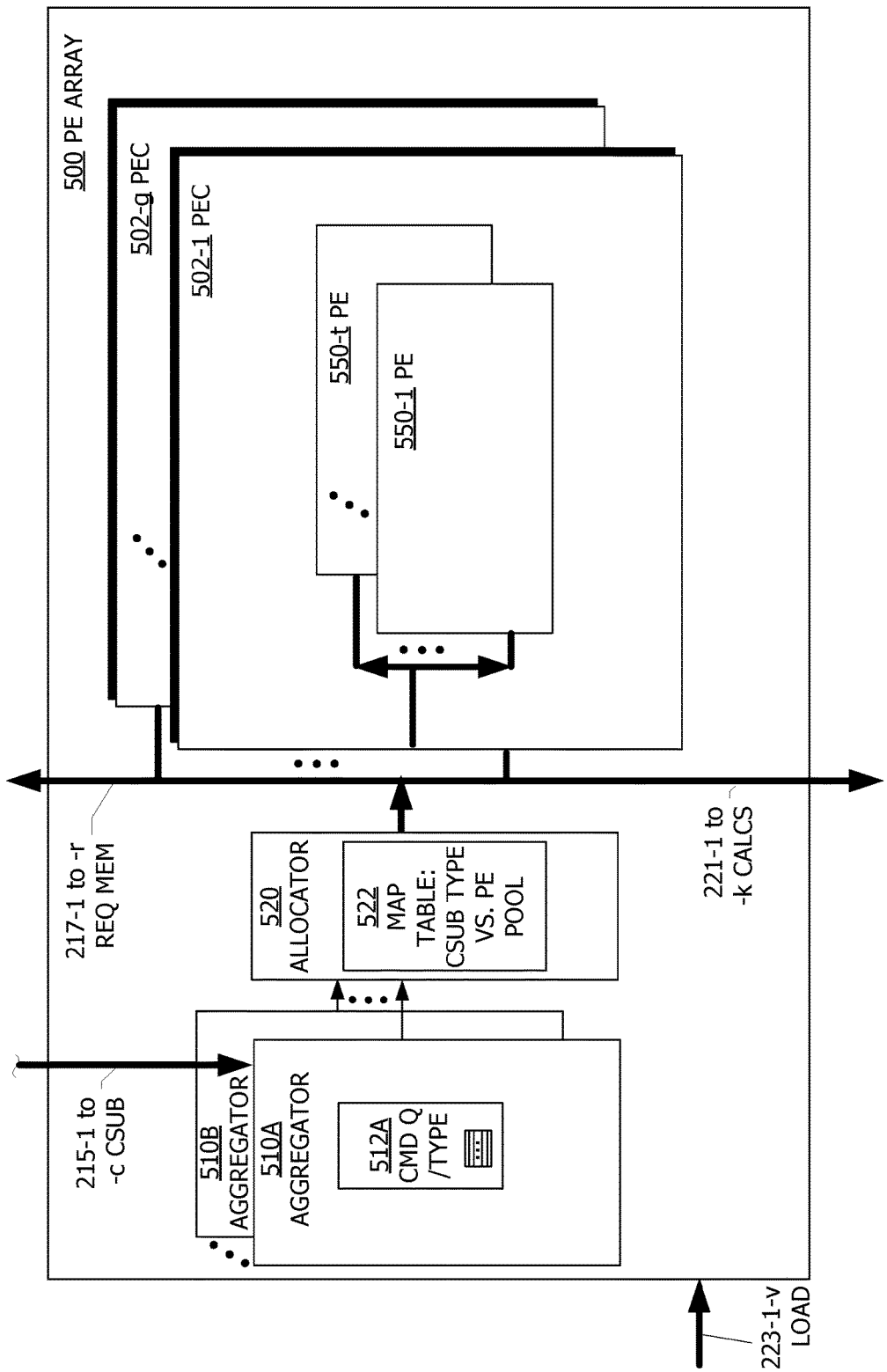
FIG. 5A is a functional block diagram of a programmable engine cluster (PEC), according to one or more embodiments.
Figure 5B:
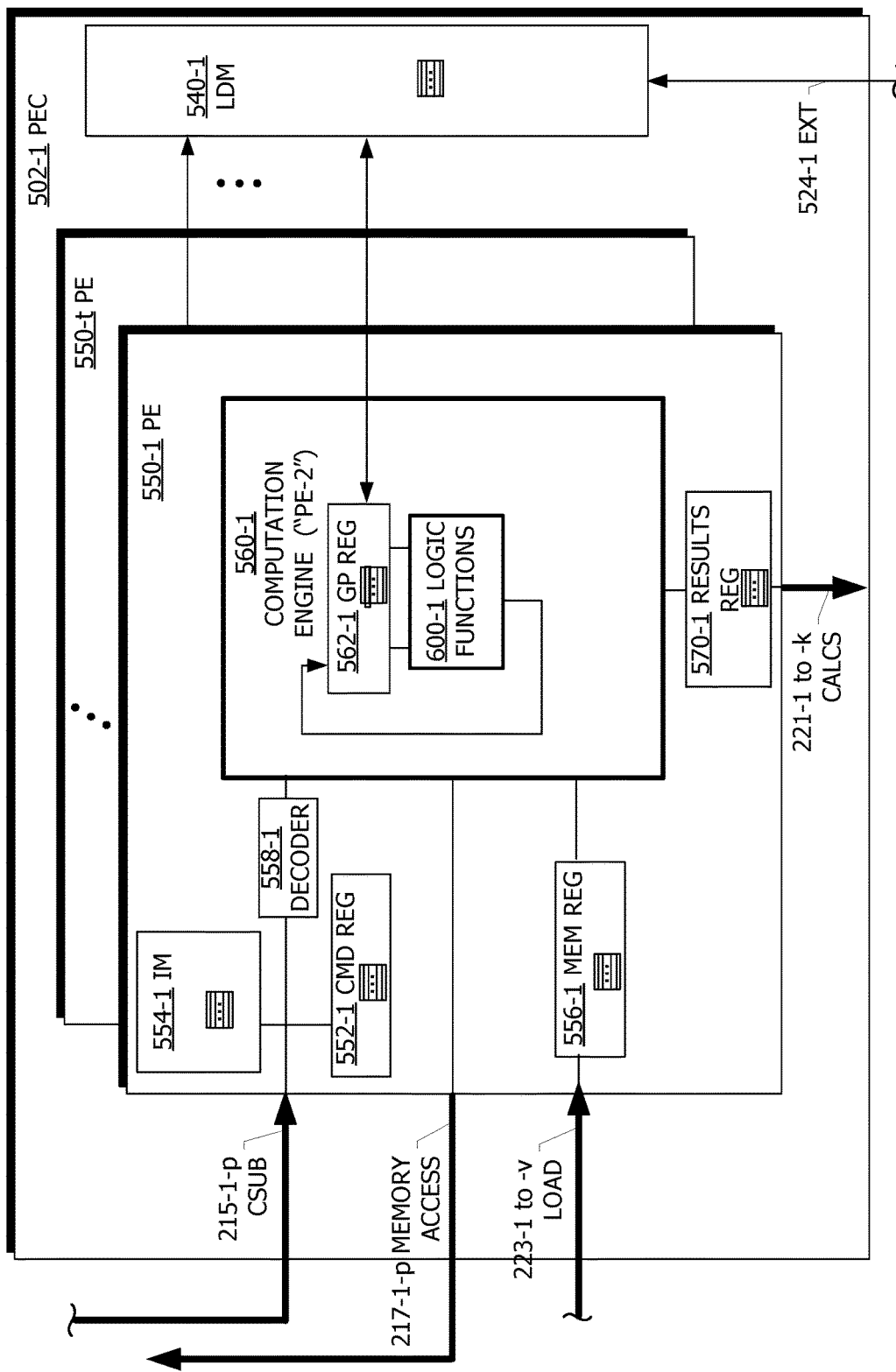
FIG. 5B is a functional block diagram of an individual programmable engine (PE), according to one or more embodiments.

Outputs from MM 400 destined for PE array 500 proceed directly out of MM 400 via lines 223-1 to 223-$v$, to memory controller 300 then into PE array 500, as further described in FIGS. 5A-5B. Thus, additional latency savings are realized by this direct routing between MM 400, memory controller 300 and PE array 500. Outputs from MM 400 via lines 219-1 to 219-$m$, where m is any bus width, and outputs from PE array via lines 221-1 to 221-$k$, where k is any bus width, are coupled to results mux 230 in parallel. The lines 219-1 to 219-$m$ first proceed to memory controller 300 for processing prior to being routed to results mux 230. Results mux 230 in turn selectively communicates data to a reorder buffer (ROB) 700 via lines SD1-SD(f) and SD(f+1)-SD(2f), according to the scheduling domain associated with the data output from MM 400 and PE array 500. ROB 700 includes an output command queue 708 and a data output buffer (DOB) 720 coupled thereto and partitioned per SD. Output ports, OUT-A and OUT-B, are paired with input ports IN-A, IN-B, respectively. Similarly, the output interface of SerDes 224A and 224B are coupled to PCS 226A and 226B in a mirror image of the input interface. Output lines A1-Ah and B1-Bj communicate the output results back to the user.

Serial interface 205 is a diagnostic port using any one of a number of slow speed serial interface standards such as SMBus, I2C, JTAG, etc. for writing and reading to specific registers on the MMCC 200 for diagnostic purposes. A debug microcontroller uC 207 is coupled to serial interface 205 for receiving commands and returning data. Debug uC 207 can communicate with other blocks on MMCC 200, such as MM 400 and PE array 500.

Overall, the modular architecture of the MMCC 200 provides a plurality of parallel flow paths through MMCC 200 both through the MM 400 and the PE array 500 such that no one path is a choke point for data through the chip. The modular architecture also provides for future scalability of the chip for greater throughput and data processing.

The NVM chip 240 stores program instructions for subroutines on which the PE array 500 executes CMDs. Instructions from the NVM chip 240 are loaded into instruction memory at initialization. Program instructions can be updated in the field when the MMCC 200 is off-line. Alternatively, program instructions can be updated to NVM 240 and implemented in MMCC 200 during field-operation while MMCC is operational with PFE 102-1. This is possible because of the modular architecture of the MMCC 200, as will be described in subsequent figures.

Optional HBM 280 is coupled via expansion (XP) bus 281 to memory controller 300 and to reorder buffer 700, in parallel with MM 400, in order to expand the on-die memory capacity of MM 400. This will allow extended table sizes and accommodate future increasing memory storage needs.

Figure 3:
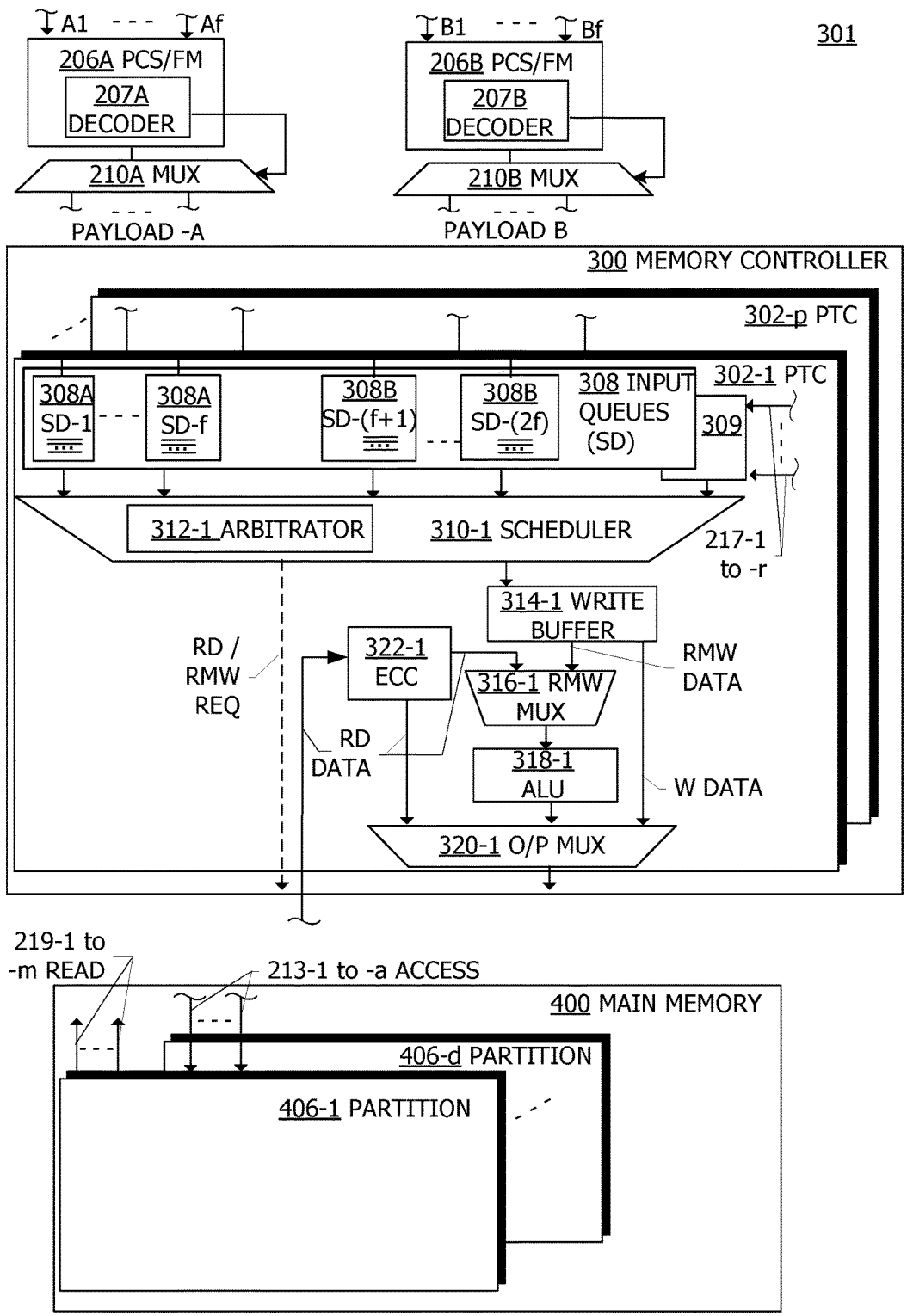
FIG. 3 is a functional block diagram of the memory controller (MC) and memory scheduler (MS) for main memory, according to one or more embodiments.

Referring now to FIG. 3, a functional block diagram 301 is shown of the memory controller (MC) 300 and memory scheduler (MS) (scheduler) 310-1 for main memory, according to one or more embodiments. Input Interface details are expanded beyond prior FIG. 2 to indicate that the PCS/FM 206A, 206B contains a decoder 207A and 207B coupled to mux 210A and 210B, respectively, to decode the transport protocol of the incoming data and frame the data appropriately for on-chip processing. Lines out of mux 210 provide payload A from port A (from PFE 102-1) while lines out of mux 210B provide payload B from port B (from optional processor 102-2) of FIG. 1, which are both communicated in parallel to memory controller 300 and PE array 500.

The memory controller 300 includes a plurality of partition controllers (PTC) 302-1 to 302-$p$, wherein p=4 for the current embodiment, to be equal to the quantity of partitions in MM 400. The components shown in 302-1 PTC are replicated in all partitions, e.g., 302-1 through 302-$p$. CMDs and their associated data are output from 210A and 210B MUXes and sorted into input queues 308 (represented by the box icon therein), and specifically into buffer 308A through 308B, for port A and port B respectively, with specific scheduling domains 1-4 shown as SD-1 through SD-f. The value of f can be any quantity of scheduling domains, with the current embodiment using f=4, for port A, and scheduling domains 5-8 shown as SD-(f+1) through SD-2f, for port B. Thus, each PTC has its own input queues 308 for both ports A and B. Scheduler 310-1 is coupled to the input queues 308, as well as to memory access CMD queue 309, which was generated by PE array 500 queues, and an optional debug CMD queue (not shown), can also be scheduled by scheduler 310-1. In particular, scheduler 310-1 selects a memory access CMD and associated data for writes, to be processed per a load-balancing schedule. The load balancing performed by scheduler 310-1 can be weighted, e.g., to favor memory accesses from PE array 500, such as twice as frequently as external memory access CMDs in input queues for SD 308. Alternatively, the scheduler 310-1 can load balance evenly using a round robin technique, or can utilize a randomized input to select from which buffer 308A and 308B the next memory access CMD will be taken, or can pick the oldest CMD queued to have the highest priority. When a given memory access CMD contains a conflict that violates the memory usage rules, as specified by the memory designer, then arbitrator block 312-1 resolves the conflict by stalling one of the conflicting memory accesses, and choosing the other CMD to proceed. For example, if a given CMD wants to perform 4 reads (Rs) from and 4 writes (Ws) to a given memory partition, and two of the reads are from the same memory bank within a memory partition, which is a known violation, then the scheduler will buffer one of the reads to that same memory bank and save it for a subsequent read that can accommodate the read request, and that doesn't have a conflict with the memory bank in question.

For a write command, typical logic is shown as write buffer 314-1, which can proceed directly to the output (O/P) mux 320-1 for a straight write, or can be muxed with read (RD) data via RMW mux 316-1 to have the 'modify' instruction of the RMW executed by ALU 318-1. Accesses that are output from PTC 302-1 are shown as lines 213-1 to 213-$a$, which can be either read control, write control and write data, or RMW control and data. Output 219-1 to 219-$m$ from MM 400 can be returned back as read data for a RMW operation. The MM 400 is shown with multiple partitions 406-1 through 406-$d$ which are described in more detail in the following figure.

Figure 4:
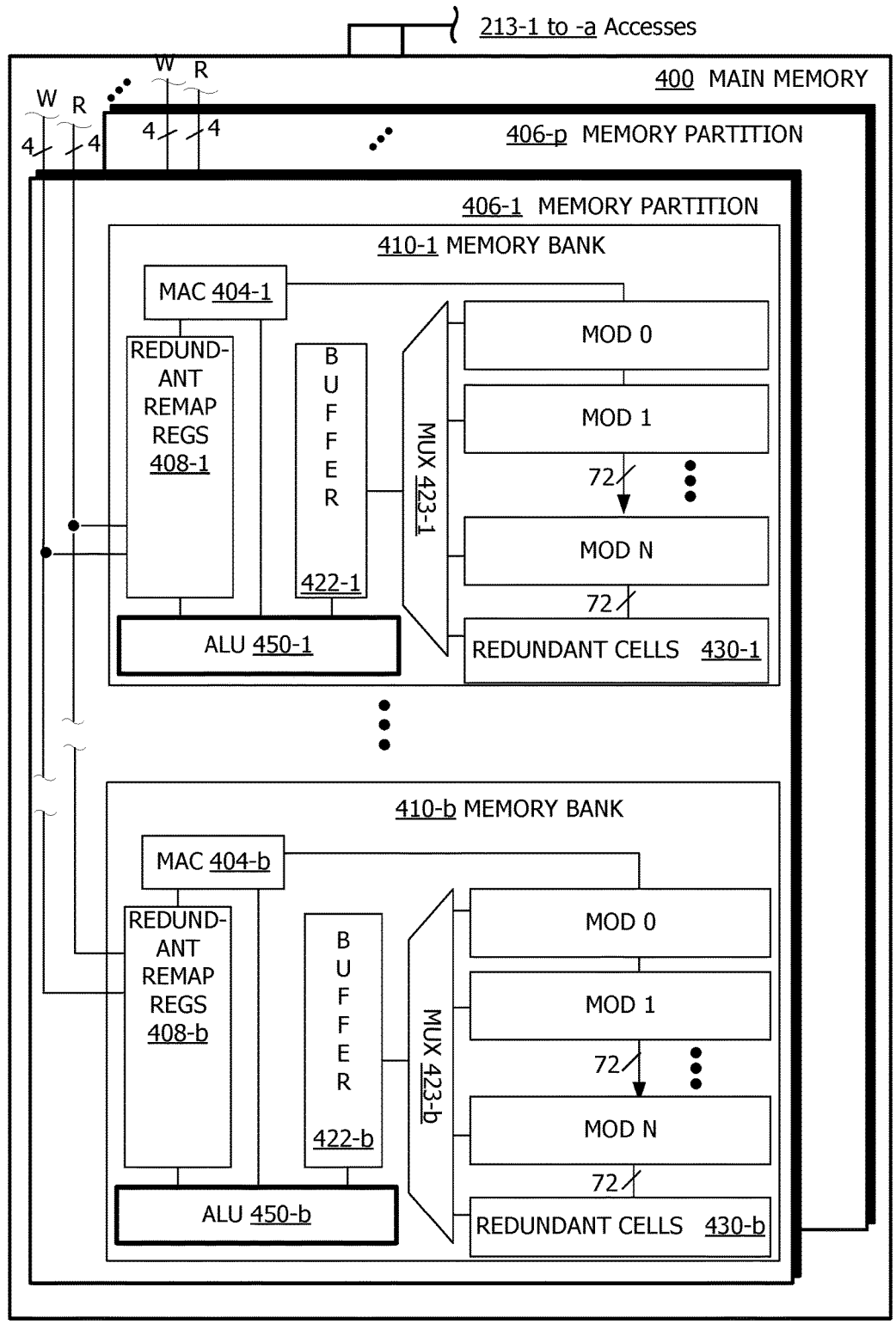
FIG. 4 is a functional block diagram of a main memory (MM) portion of the MMCC according to one or more embodiments.

Referring now to FIG. 4, a functional block diagram is shown of a main memory (MM) 400 portion of the MMCC according to one or more embodiments. MM 400 is shown here in more detail than in prior FIG. 3, MM 400 is comprised of a plurality of memory partitions 406-1 to 406-$p$, where p is any number, but p=4 for the present embodiment. Each partition 406-1 through 406-$p$ is comprised of a plurality of memory banks 410-1 through 410-$b$, where b is any quantity, but is 64 in the present embodiment. And each memory bank 410-1 through 410-$b$ comprises: a memory access controller (MAC) 404-1 coupled to redundant remap registers 408-1 for indicating memory addresses that have been replaced with redundant memory; an ALU 450-1 for performing local operations; and a buffer 422-1 for buffering read and write data into and out of the memory modules, MOD 0 through MOD N via MUX 423-1, including redundant cells 430-1. Word size is shown as 72 bits, though any size word can be utilized. Each partition 406-1 through 406-$p$ has four write (W) lines and 4 read (R) lines in the present embodiment that can be accessed simultaneously for a given partition, so long as the access rules are met, e.g., none of the Ws and Rs can go to the same bank, though any quantity can be designed in with sufficient control logic. More detail on the memory partitions and banks is disclosed in: i) U.S. Pat. No. 8,539,196, issued Sep. 17, 2013, entitled: "HIERARCHICAL ORGANIZATION OF LARGE MEMORY BLOCKS", issued Sep. 17, 2013; and ii) U.S. patent application Ser. No. 12/697,141, filed Jan. 29, 2010, entitled "HIGH UTILIZATION MULTI-PARTITIONED SERIAL MEMORY", both of which are commonly assigned with the present application and both of which are hereby incorporated by reference in their entirety Referring now to FIG. 5A, a functional block diagram is shown of a programmable engine cluster (PEC), according to one or more embodiments. PE array 500 is comprised of a plurality of PECs 502-1 through 502-$g$, with each having a plurality of PEs 550-1 through 550-$t$, with t and g being any values, but are g=8 and t=4 in the present embodiment, for a total of 32 PEs per PE array 500. Details of the individual PEs 550-1 through 550-$t$ are provided in the next figure.

The PE array 500 also includes logic blocks aggregator 510A and 510B, one for each of ports A and B, respectively, coupled to allocator 520, whose function is to allocate CSUB CMDS from aggregators 510A and 510B to one of the PEs 550-1 to 550-$t$ from the pool of PEs in PECs 502-1 through 502-$g$. Each aggregator 510A, 510B includes a command queue (Q) 512A for buffering a CMD in a specific partition according to the type of the CSUB in the CMD that was received on line 215-1 to 215-$c$. Aggregator 510A classifies the CMD into a partition of CMD Q 512A according to categories configurably established by the user, i.e., the PFE 102-1, at initialization. Thus, in one example embodiment, all CMDs can be classified into one of the following four types, and respective queues in CMD Q 512A: i) all CMDs for a LPM CSUB are classified as a first type in a first queue; ii) all EXACT MATCHES and SEARCH CSUBs are classified together as a second type, and interleaved per a FIFO protocol, in a second queue; any high-priority CMDs for a LPM having a unique CSUB opcode are classified as a third type of CMD that is a lightly populated and frequently accessed queue; and iv) all other CSUB CMDs are lumped together as a fourth type in a fourth queue.

Allocator 520, couples aggregators 510A, 510B to PEs 550-1 through 550-t in each of the PECs 502-1 through 502-g, in order to allocate a CSUB CMD to an eligible PE. Load balancing can be implemented in a number of ways. First, by defining the classification system of CSUB CMDs, a natural prioritization occurs by either oversizing or undersizing a classification of CSUB CMD rate for that classification. For example, one network application could have an extremely frequent occurrence of two types of CSUB CMDs, and an infrequent occurrence of all other CMDs. If a user classifies the two types of CSUB CMDs having frequent occurrences as separate types of CSUB CMDs, then it has an effect of load balancing, versus classifying them together as a single type. Another method for the user to effectively configure load balancing of the PE array 500 is to: i) load the entire instruction set into the instruction memory for all PEs so that all PEs are eligible to execute any CSUB CMD, which effectively flattens the PE array 500 into a set of fungible resources (PEs); ii) load instructions for only a subset of the CSUB codes in a number of PEs, either to detune them, or because the instruction set for the entire CSUB exceeds the capacity of the instruction memory for the PE; or iii) arbitrarily assign a quantity of PEs to given type of CSUB CMDS.

Map table 522 of allocator 520 maps the types of CSUB CMDs against the IDs of PEs that are eligible to execute those types of CSUB CMDs, and the status of the multiple threads of those PEs. Whenever a thread resource of a given PE is available, and the PE eligibility matches a CSUB CMD waiting in the CMD Q 512A, then the allocator allocates the CSUB to the eligible PE on a FIFO basis where the first CMD in the queue for that type of CMD will be allocated. By providing this configurability, a user has control over where the resources are allocated. The user can also update the allocation depending on field performance and network demands by reinitializing MMCC 200 with an updated map table. The redundancy of the PE resources provides a backup via alternate processing paths if a given PE stalls or fails, provided that another PE is assigned to the same type of CSUB CMD. A CSUB call for a memory access from PE array 500 is individually and independently communicated on 217-1 through 217-r lines to the memory controller 300 of FIG. 3, with results also being independently returned to PE array 500 directly via line 223-1 through 223-v, through memory controller 300 thereby reducing latency of a memory access up to three orders of magnitude. Output data from a completed CSUB code is communicated out of PE array 500 via lines 221-1 through 221-k lines.

Referring now to FIG. 5B, a functional block diagram is shown of an individual programmable engine (PE) 550-1, according to one or more embodiments. The heart of PE 550-1 is the computation engine 560-1, comprised of logic functions 600-1, which are described in a subsequent figure, coupled to a general-purpose register (GP REG) 562-1. Logic functions 600-1 comply with a classic five-stage reduced instruction set computer (RISC) protocol that executes one instruction per cycle. However, computation engine 560-1 is not a general purpose CPU (GPCPU) because it does not have an operating system (OS), and does not support an 'interrupt' or a 'cache-control instruction. Once an instruction is started on the PE, it runs until completion.

The PEC 502-1 is comprised of a plurality of PEs 550-1 to 550-t coupled to each other and to shared local data memory (LDM) 540-1 that provides faster access of urgent or frequently used data compared to MM 400. PEC 502-1 offers fastest access because of its closer proximity to the PEs 550-1 to 550-t, and because it is an SRAM memory type, which is faster than the eDRAM memory type of MM 400. The LDM 540-1 is also accessible externally from PEC 502-1 by line 524-1, to other PEs in other PECs 502-1 to 502-g, though the extra distance and logic required for an access external to its given PEC 502-1 results in slightly longer access time. By disposing memory locally, reduced latencies are accomplished. By sharing the local data memory 540-1 resource via intra-PEC or inter-PEC, memory resources can be effectively shared to accommodate an intermittently high memory demand in a given PE.

The CSUB CMD is communicated to the PE 550-1 via one or more lines 215-1 through 215-p. The CSUB CMD points to a starting line of the given CSUB code in instruction memory (IM) 554-1 or in CMD registers (CMD REG) 552-1, which is subsequently decoded by decoder 558-1 and processed by computation engine 560-1. As indicated by the partitions icon, IM 554-1 and CMD REG 552-1, these resources are partitioned to a quantity of processing threads instantiated by a user of the PE array 500. That is, the multi-threaded processing threads of the CP are configurable, heterogeneously through the array. Thus, one or more of the PEs could be configured to operate concurrently with different quantity of threads. For example, a quantity of PEs could be configured with different threading as follows (quantity PEs/number of threads: 1/8, 5/7, 4/6, 1/5, 19/4, 1/1, 1/0 (not used). This offers a user a wide variation in performance adaptation to given application. Furthermore, these differently configured PEs could be assigned different types of classes of CSUB CMDs. Thus, short CSUBS could be assigned to run on PEs configured with 8 threads because short CSUBs will finish quicker. Moreover, longer CSUB code can be assigned to PEs configured with only 1 or two threads, because they need more bandwidth to complete the SUB. Thus, the bandwidth of the resource is divided equally among the quantity of partitions selected, from one to eight in the present embodiment, as determined by the user and as implemented during initialization of MMCC 200. Memory register 556-1 is similarly partitioned per processing thread to hold data values fetched by computation engine 560-1 via line 217-1 to 217-p from MM 400 and returned from MM 400 on lines 223-1 through 223-v. Output results from computation engine 560-1 are stored in results register (REG) 570-1 per the processing thread partition therein, and finally output on lines 221-1 through 221-k.

Figure 6:
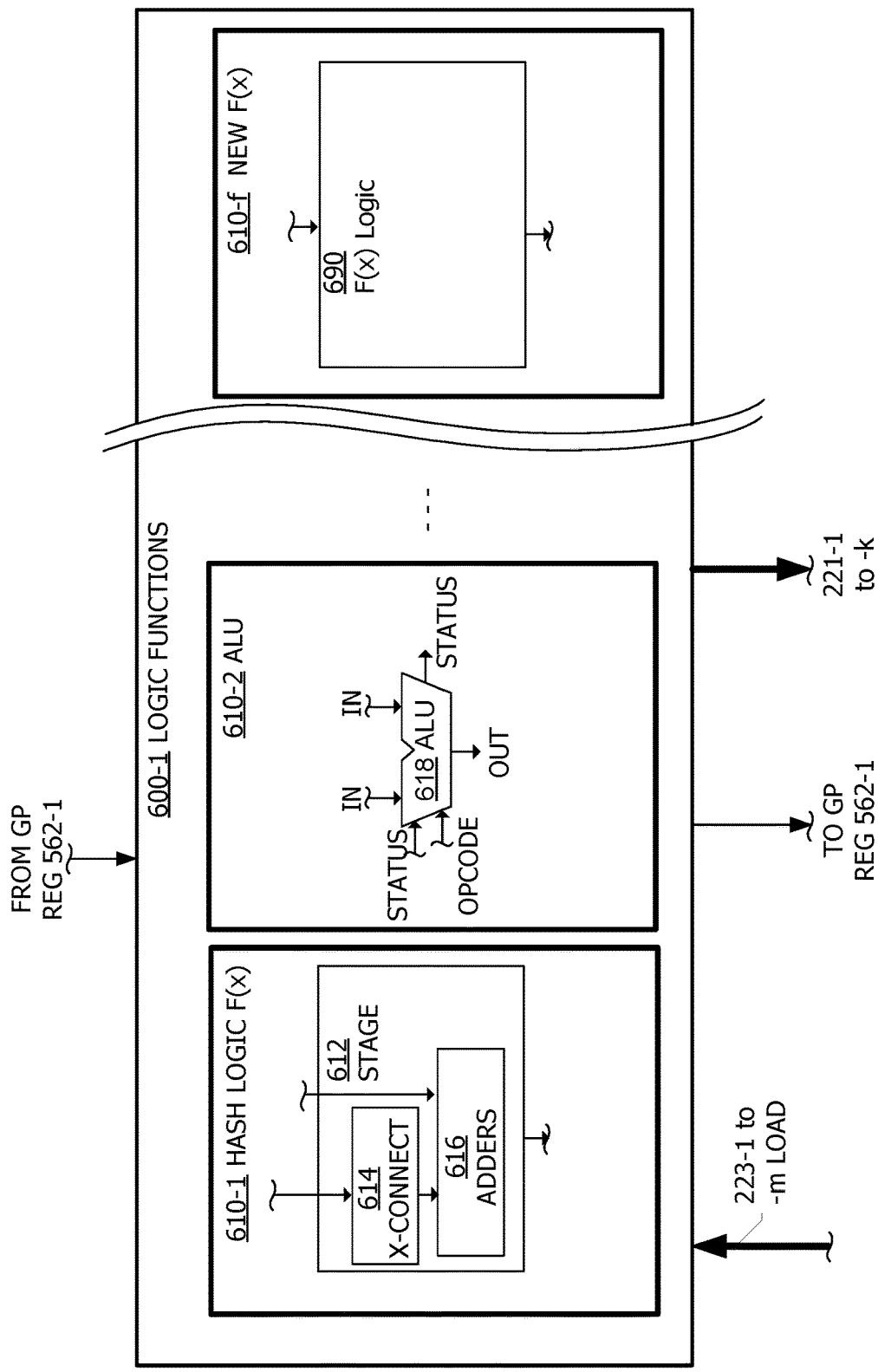
FIG. 6 is a functional block diagram of logic function blocks of the PE, according to one or more embodiments.

Referring now to FIG. 6, a functional block diagram is shown of logic function blocks 600-1 of the PE, according to one or more embodiments. Instructions read from CMD REG 552-1 or IM 554-1 of FIG. 5B and executed by computation engine 560-1 of PE 550-1, are more specifically executed by logic functions 600-1 of the present figure. Results are returned back to GP REG 562-1 and fed back into logic functions 600-1 as required until the CSUB code is completed and results are output as 221-1 through 221-k calculations. Data required for execution of an instruction can be fetched from MM 400 or LDM 540-1 and input on line 223-1 through 223-v as a load of data.

Logic function block 600-1 shown in FIG. 6 includes a plurality of different logical functions integrated together for a specific application, and can be any combination of said logical functions. In the present embodiment of network processing, the functions relating to packet processing and address lookup, traffic management, etc. are relevant. Hence, specific functional blocks are microcoded into the MMCC 200 for fast processing and minimal latency. In particular, a hash logic function (F(x)) block 610-1 is shown with a single stage 612 comprising a cross-connect (X-connect) 614 block coupled to an adder block 616. This block is programmably recursive, per the user for repetitive rounds. More detail is disclosed in PCT Patent Application No. PCT/US14/72870, filed Dec. 30, 2014, entitled "RANDOMIZER CIRCUIT", attorney docket MP-1248, which application is commonly assigned with the present application and which is hereby incorporated by reference in its entirety. Another function block 610-2 is an arithmetic logic unit (ALU) 618. An entire library of functional blocks, through functional block 610-*f* for a new function with logic 690, can be designed into the MMCC 200 in order to provide a desired scope of co-processing functionality desired by a designer, and as needed by a host processor.

Figure 7:
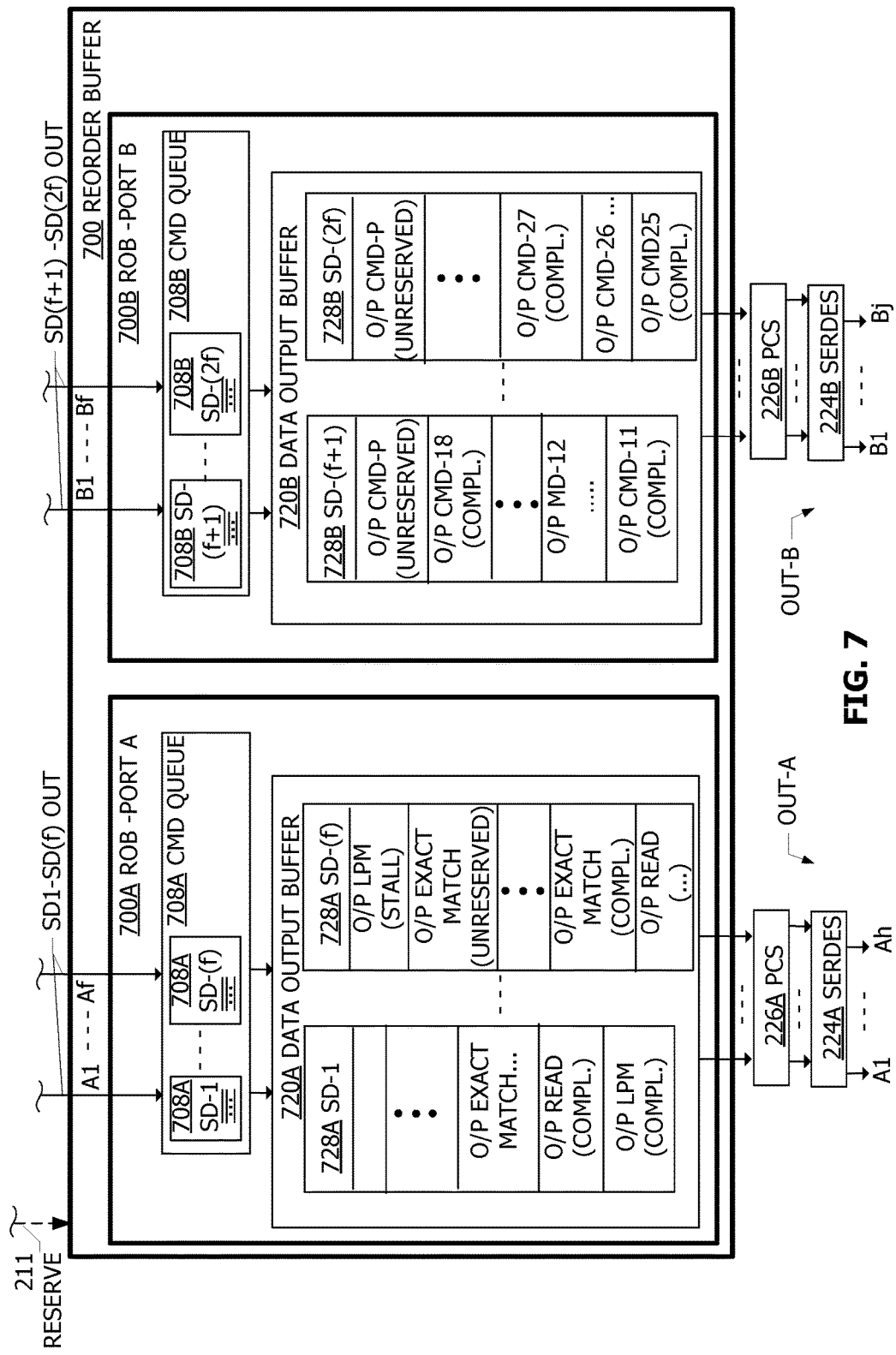
FIG. 7 is a functional block diagram of a reorder buffer (ROB) for maintaining a FIFO sequence across the I/O scheduling domain, according to one or more embodiments.

Referring now to FIG. 7, a functional block diagram is shown of a reorder buffer (ROB) 700 for maintaining a FIFO sequence across the I/O scheduling domains of MMCC 200, according to one or more embodiments. The ROB 700 is comprised of a separate ROB 700A for Port A, with inputs A1-Af for SD-1 through SD-(f), and a separate ROB 700B for Port B, with inputs B1-Bf, for SD-(f+1) through SD-(2f), where f=4 in the present embodiment for a total of eight scheduling domains.

The ROB 700A for port A, which mirrors ROB 700B for port B, comprises a command queue output buffer (CQOB) 708A and a DOB 720A, each having separate partitioned memory per scheduling domain, 708A SD-1 to 708A SD-(f), and 728A SD-1 to 728A SD-(f), respectively, to store CMDs from reservation line 211 reserve and to store the results received from results mux 230, shown in FIG. 2, respectively. Thus, outputs from both MM 400 and from PE array 500 are interleavedly received and sorted per SD by results mux 230 into the respective buffers associated with the appropriate SD.

For example, in ODB 728A SD-1, the first in, and first out entry is the bottom entry of an output for the 'longest prefix match' (O/P LPM) CMD, which corresponds to row 3 of FIG. 9, whose data is completed (COMPL.), and thus will transmit out Port A output interface 226A, 224A upon its load balanced turn, e.g., round robin. The next output data in the ODB 728A SD-1, is the 'read' access CMD, corresponding to row 2 of FIG. 9, which has also completed loading its data (COMPL.), and is awaiting the prior output, LPM CMD, to finish transmitting first. The next entry in ODB 728A SD-1 is the 'exact match' CMD, which corresponds to row 1 of FIG. 9, is still pending results data ( . . . ) but whose discrete size of data is known and therefore reserved in the ODB 728A SD-1.

In comparison, the ODB 728A for SD-(f) of the present figure shows a 'read' CMD entry at the bottom of the queue corresponding to row 19 of FIG. 9, which has the highest priority to transmit but is still loading data ( . . . ). This delay occurred possibly because the read CMD was stalled due to low priority in the memory scheduler 310-1 or because of a repeating access conflict per arbitrator 312-1 of FIG. 3. Regardless, the 'exact match' CMD, which corresponds to row 18 of FIG. 9, that is second from bottom output data buffer 728A, and has completed saving output data (COMPL.), is prevented from being transmitted because the FIFO protocol dictates that data associated with the bottom CMD of 'read' should be the first item transmitted.

Regardless of the wait for SD-(f), other scheduling domain queues, i.e., SD-1, can still transmit output results if the appropriate FIFO CMD data for that scheduling domain has completed loading in output data buffer 728A. Thus, the modularity of the present embodiment might incur some stalls or delays, but all other autonomous portions of MMCC 200 can continue executing, thus providing a higher overall efficiency and duty cycle of the chip as a whole. Further up the queue in ODB 728A for SD-(f), the reservation of output data buffer space for the 'exact match', corresponding to row 18 of FIG. 9, has not completed a deterministic calculation yet (UNRESERVED) and thus, will stall the saving of output data for the subsequent CMD in the queue of 'LPM' even if its data is ready to write. This rule is to preserve the FIFO protocol, which could be thwarted if output data for LPM CMD consumes all available memory in output data buffer 728A for SD-(f) and prevents output from the earlier 'exact match' CMD from writing its data to the output data buffer 728A.

Flowcharts

Figure 8A:
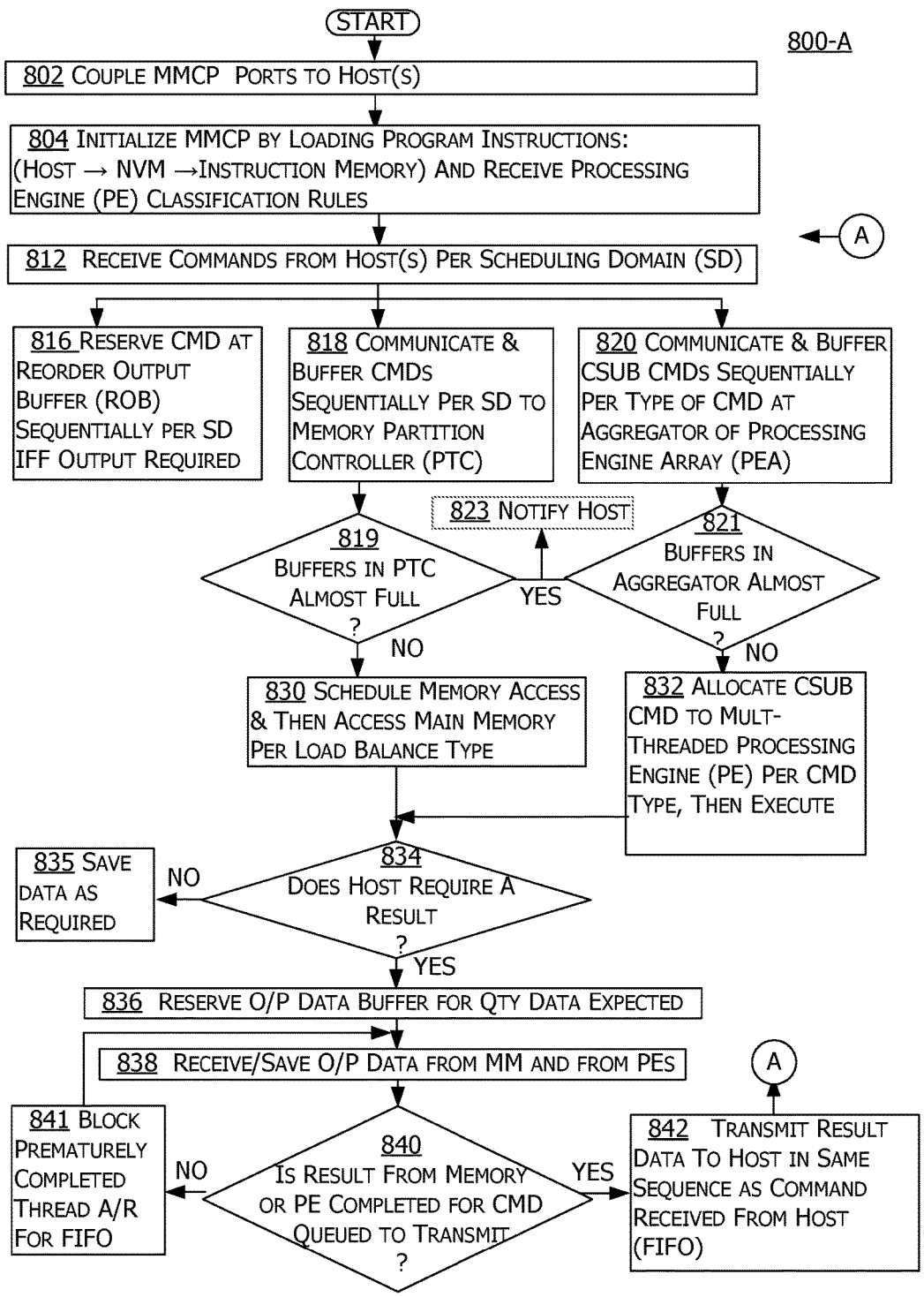
FIG. 8A is a flowchart of a method for operating an IC with an I/O scheduling domain in the MMCC, according to one or more embodiments.

Referring now to FIG. 8A, a flowchart 800-A is shown of a method for operating an IC with a multi-threaded I/O scheduling domain in the MMCC, according to one or more embodiments. Operation 802 couples the MMCC ports to the host. Each individual port, A and B, can be slaved to a single processor, i.e., PFE 102-1, as shown in FIG. 1, or each individual port, A and B, can be slaved to any quantity of processors such that each port is slaved only to one processor and not shared by more than one processor. Thus, in one embodiment, port A is slaved to PFE 102-1 while port B is slaved to processor 102-2 as shown in FIG. 1. Because the scheduling domains are tied to the ports, the slaving of the MMCC 200 to a plurality of processors does not require the plurality of processors to schedule the resources of the MMCC 200 themselves, and does not require the processors to manage conflicts with each other. Thus, a single chip can be used in different line card sockets that will slave the chip to a different quantity of processors without requiring any kind of reconfiguration or parameter setting in the chip.

Operation 804 initializes the MMCC by loading CSUB code program instructions, CSUB CMD classification rules, and a PE assignment schedule from the host, PFE 102-1, to the NVM 240 of the MCM 201 in FIG. 2 and into IM 554-1 as shown in FIG. 5B. Subsequent initializations of MMCC 200 read the program instructions directly from the NVM 240 into IM 554-1. The PE classification rules will: i) specify different types of classifications of CSUB CMDS; ii) assign a quantity of PEs for each of the types of CSUB CMDS. These rules and assignments are stored in MAP table 522 of allocator 520, as shown in FIG. 5A. The choice of the rules and assignments is a form of load balancing available to the user for the multiple redundant PE resources in MMCC 200.

Figure 10:
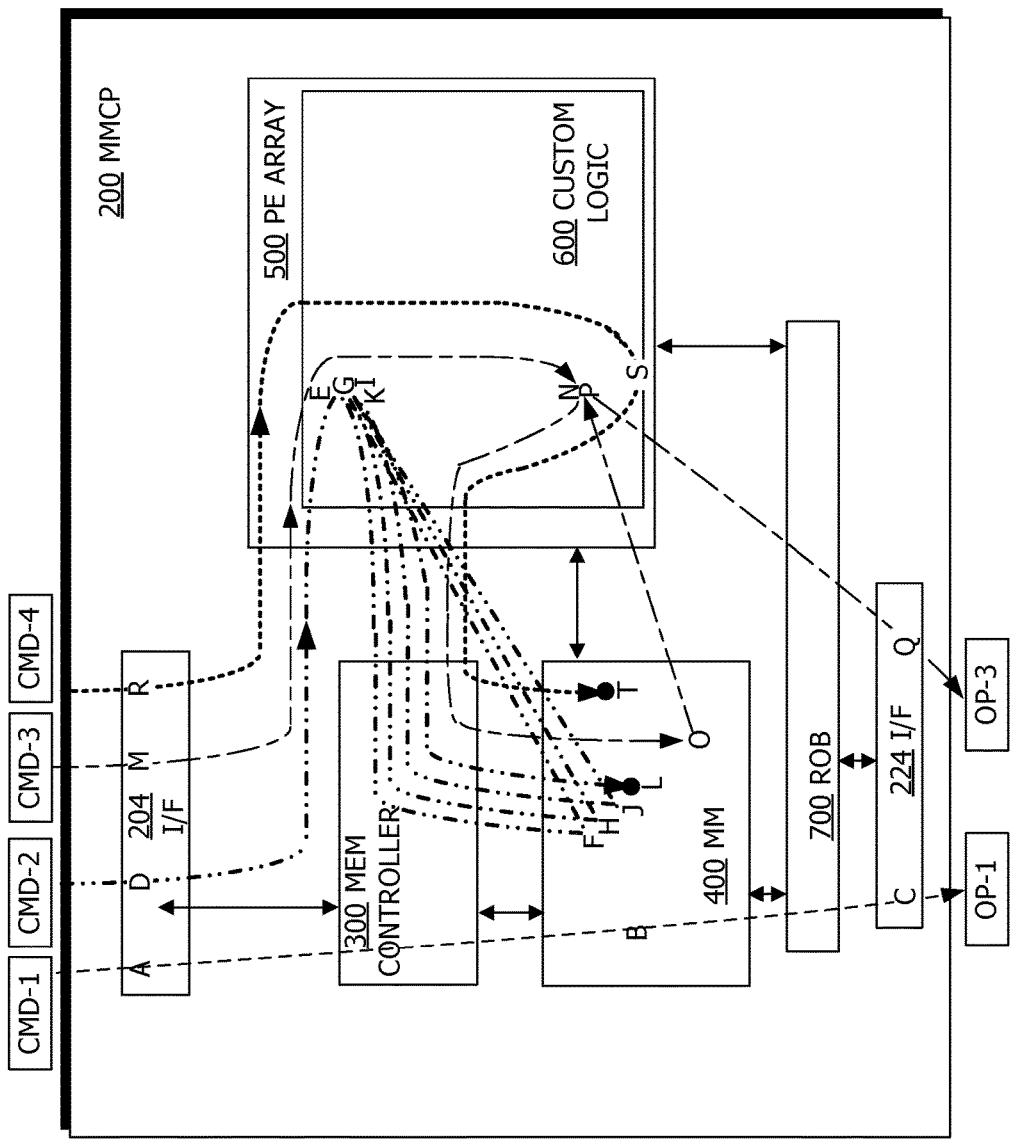
FIG. 10 is a flow-path illustration of multiple commands concurrently executing on the MMCC to both access MM and to call subroutines in the CP, according to one or more embodiments.

Operation 812 receives memory access commands and CSUB commands from one or more hosts on a scheduling domain basis at an input interface 204 of FIGS. 2 and 10. Because the SDs are globally unique in the MMCC, the input ports and data received on them have a unique identity, as shown in FIG. 2. The host can schedule any memory access CMD or CSUB CMD it wants to in any of the scheduling domains. Thus, the host can spread the same commands types across multiple scheduling domains and thereby provide a type of load balancing on the requests as well, assuming a round robin load balancing is performed by memory controller 310-1. Alternatively, different types of prioritization can be accomplished by reserving some scheduling domains for higher priority memory accesses CMDS requested by the host. This would have the effect of bypassing the loaded queues in other scheduling domains. A user-programmable load balancing instruction to the memory scheduler specifies the sequence and repetition with which to select the queues in the PTC 302-1. Those load balancing instructions can also provide for priority access to a given scheduling domain queue over all other queues whenever the given scheduling domain receives a CMD. As noted in FIG. 5A, different load balancing techniques are available for prioritizing or balancing CSUB CMDs vis-à-vis PEs.

Once a CMD is received by the MMCC 200, the CMD is communicated in parallel to a plurality of locations on the chip as specified in operations 816, 818, and 820. In particular, operation 816 communicates the command via reservation line 211 of FIG. 2, to ROB 700 shown in FIG. 7, IFF the CMD requires an output. This is done to maintain a FIFO processing of commands received at the MMCC 200, on a scheduling domain-by-scheduling domain basis. If a CMD does not require an output, then the CMD is either not communicated to, or is ignored by, ROB 700. In an alternative embodiment, a global FIFO sequencing is maintained by assigning a global sequence value that tracks with the data throughout the execution of the CMD. However, one consequence with this global protocol would be the potential backing up all subsequent CMDs to a stalled CMD slated in a single SD.

In operation 818, the CMD is also communicated parallel to the memory controller 300 in general, and specifically to the memory partition controller 302-1 to 302-$p$ specifically, as shown in FIG. 3. If and only if (IFF) the CMD is a memory access CMD, then it along with any associated write data is sequentially buffered per its SD in the appropriate input queue buffer 308, e.g., one of 308A buffers from SD-1 through SD-(f). Else, the CMD is disregarded.

In operation 820, the CMD is also communicated parallely to the aggregator 510A for Port A, or 510B for Port B. IFF the CMD is a CSUB CMD, then it is classified by aggregator 510A in FIG. 5A according to its type of CMD, per rules received in operation 804. It is then buffered in an appropriate partition in command queue 512A per the CMD type. A wide range of load balancing options and prioritization schemes for the CSUB CMDS are available to a user according to how the user configurably classifies the CSUB CMDS, as disclosed in FIG. 5A and in the summary section herein.

Operations 819 and 821 inquire whether the command buffers 308 in PTC 302-1 of FIG. 3 and command/data buffer 512A of FIG. 5A, respectively, are nearly full. If they are, then MMCC 200 notifies the host per operation 823, which will then restrict issuance of new CMDs. This present embodiment is a notice based flow control, which is lower overhead for the user. The notice can be either a data link layer (DLL) notice or a transaction layer notice using a communication protocol, e.g., GigaChip interface protocol. One interface protocol used by the MMCC is described in more detail in U.S. Pat. No. 8,370,725, issued Feb. 5, 2013, entitled: "COMMUNICATION INTERFACE AND PROTOCOL", issued Sep. 17, 2013, attorney docket MP-1160, which is commonly assigned with the present application and which is hereby incorporated by reference in its entirety. The transaction layer notice is faster but consumes more overhead. However, the expense of using a transaction model frame for a transaction alert is justified because of its infrequent occurrence and because of the severity of the exceptional condition such as: queues nearing 'full' or nearing 'empty'; or one or more uncorrectable error conditions like a multi-bit error detected by EDC. However, the present disclosure is also well suited to an alternative embodiment of using a token system, wherein the host manages a given population of tokens for different resources on the MMCC, extracting a token when requesting a resource, and crediting a token when a resource has completed a task.

Operation 830 arises if buffers in PTC 302-1 are not full and can store the CMD and associated data. The CMD is scheduled in operation 830 per the scheduler 310-1 of FIG. 3, and executed on MM 400 of FIG. 4. The scheduling operation 830 includes resolving any potential conflicts by arbitrator 312-1 for an access CMD to a same memory bank in a partition by having one of the accesses postponed for another cycle. A wide range of load balancing options and prioritization schemes for scheduling memory accesses per the scheduling domain are available to a user according to how the user configurably programs the scheduler to schedule each of the given scheduling domain queues 308A SD-1 to 308B SD-(2f), including round robin and weighting of queues, as disclosed in the summary section herein. The data accessed by MMCC 200 is not data that needs to be fetched from an off-chip memory into an on-chip cache. Thus, the present disclosure reduces latency by making all memory access to on-chip memory.

Operation 832, similarly to operation 830, arises if CMD and data buffers in aggregator 510A and 510B are not full and are capable of storing the CMD and associated data. In operation 832 allocator 520 allocates, on a FIFO basis, a given CSUB CMD retrieved from the command queue 512A to a next available thread of a PE in PE array 500 that is eligible per map table 522, as shown in FIG. 5A. The eligible and/or assigned PEs for a given type of CSUB CMD are specified by the user in operation 804. Details for operation of the multi-threaded processor once a CSUB CMD has been assigned are described in subsequent flowchart 800-B.

After operations 830 and 832, an inquiry per operation 834 determines if the host requires an output result. If a result output is not required, then operation 835 saves the data as required, e.g., typically to MM 400 in FIG. 4, or to LDM 540-1 in FIG. 5B.

If a result output is required, then operation 836 reserves a deterministic portion of the DOB 720A or 720B, depending on the port, as shown in FIG. 7. If a deterministic calculation cannot be made, then subsequent CMDs trying to write output result data to the DOB 720A and 720B will be stalled until such time as the deterministic calculation can be made. An example is shown in FIG. 7 as output data buffer 728A for SD-(f) where the 'exact match' CMD is listed as 'UNRESERVED,' thereby blocking any subsequent CMDs, i.e., output for 'LPM' CMD is STALLED, in the same SD from writing their output results in the output data buffer 728A SD-(f). This requirement exists to preserve the FIFO aspect of the MMCC 200. Else, data from a subsequent CMD might consume the entire buffer, and void the FIFO protocol for an earlier CMD. If a subsequent CMD is stalled, then the given thread for that CMD on the given processor is stalled, and the round robin processing thread will continue to skip that thread and process the remaining threads until the given thread becomes reactivated from the stall, i.e., because the prior CMD has completed its deterministic reservation of output data buffer.

After the output data buffer is reserved for a deterministic amount of data, operation 838 saves data from the MM 400, via partition controller 302-1, or from the PE array 500 as output results in the DOB 720A or 720B in FIG. 7. Operation 840 inquires if the output data results from memory access or PE subroutine are completed for the given CMD to transmit out of ROB 700. If not, then operation 841 blocks prematurely completed threads, as required to maintain FIFO protocol. This is illustrated in FIG. 7 for DOB 720A for SD-(f) where output data for the 'read' CMD is still loading ( . . . ), and thus, the output data for the subsequent 'exact match' CMD, while showing as COMPL. is blocked from being transmitted until its turn in the queue. While blocking a prematurely completed thread from transmitting, operation 838 is repeated to receive and save output data from the MM and the PEs to fill the output data buffer for the CMD currently queued for an immediate transmission.

If inquiry 840 results in a yes, then that output results are completely written into DOB 720A for the current CMD and operation 842 transmits those output data results to the host in the same sequence as the command received from the host to effectuate a FIFO protocol. This is illustrated in FIGS. 7 and 9.

Figure 8B:
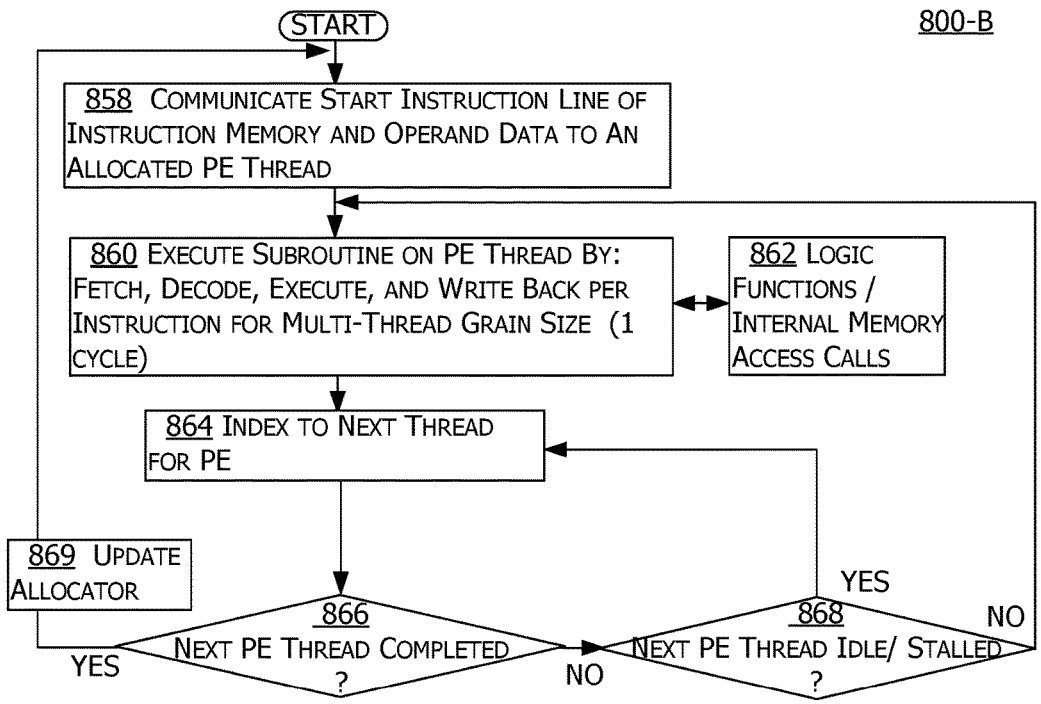
FIG. 8B is a flowchart of a method for operating a multi-threaded coprocessor (CP) in the MMCC, according to one or more embodiments.

Referring now to FIG. 8B, a flowchart 800-B is shown of a method for operating a multi-threaded coprocessor (CP) in the MMCC, according to one or more embodiments. Once operation 832 of FIG. 8A allocates the CSUB CMD to a PE thread, then operation 858 of the present flowchart communicates the CSUB CMD and associated operand data to a processing thread portion of CMD REG 552-1. The CSUB CMD has start line instruction that points to IM 554-1 of FIG. 5B for the appropriate CSUB code, which is then executed by computation engine 560-1.

In operation 860, the PE thread executes the subroutine by fetching, decoding, executing, and writing back per the program instructions, on a fine grain multithreading cycle of one execution per cycle. Table 900 in FIG. 9 provides examples of the instruction sequences in column 5 for a given command in column 2. Supporting operation 862 is the implicit logic function calls to logic function block 600-1 shown in FIGS. 5 and 6 and the memory access calls to main memory 400 via queue 309 in a partition controller 302-1 as shown in FIG. 3, as well as return data from those calls.

In operation 864, the PE indexes to a next thread in its queue. Operation 866 inquires if the next PE thread is completed. If the next PE thread has completed, then operation 869 updates allocator 520 of FIG. 5A to indicate an open thread resource to which allocator can assign a new CSUB CMD. If the next PE thread has not completed, then operation 868 inquires if the next PE thread is idle or stalled. If the next PE thread is idle or has stalled, then operation 864 indexes the PE to the next thread and returns to operation 866 to execute the instruction for that next thread. If the next PE thread is not idle or stalled, then operation 860 executes the instruction for the given thread.

Figure 8C:
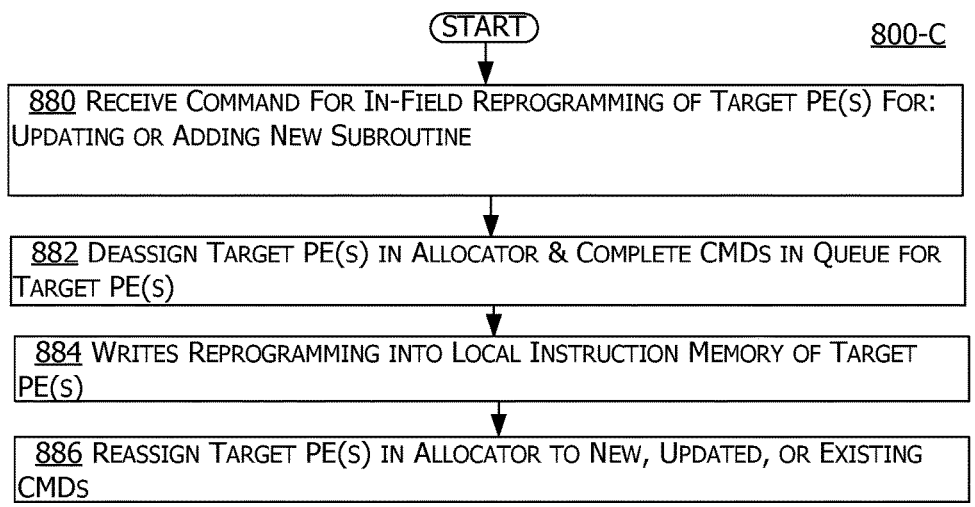
FIG. 8C is a flowchart of a method for reconfiguring a PE with a new instruction set during field operation, according to one or more embodiments.

Referring now to FIG. 8C, a flowchart is shown of a method for reconfiguring a PE with a new instruction set during field operation, according to one or more embodiments. Operation 880 receives a command via serial port 205, using a SPI, SMBus, or I2C protocol, for an in-field reprogramming of one or more target PEs for updating or adding a new subroutine. Operation 882 deassigns a target PE from map table 522 of allocator 520, shown in FIG. 5A, by overwriting an entry in map table 522 during idle cycles using debug microcontroller (uC) 207 as shown in FIG. 2 and by allowing the subroutines currently running on the target PE to execute to completion. Then operation 884 writes the updated or new subroutine reprogramming into IM 554-1 of the target PE of FIG. 5B, and optionally to NVM 240 of FIG. 2 using debug uC 207 during idle cycles. Operation 886 reassigns Target PEs in map table 522 by overwriting the PE back into the table using debug uC 207 during idle cycles.

Case Table

Referring now to FIG. 9, a case table 900 is shown illustrating an I/O scheduling domain and the PE multi-threaded domain for a single port according to one or more embodiments. The table 900 has 20 rows of data, itemized as rows 1-20, one row for each CMD (col. 2) received at MMCC 200 on a single port, e.g., port IN-A, as shown in FIG. 2. The only input scheduling domains (SD IN) shown are 1-4 (col. 1) are associated with the first port, port A or IN-A, slaved to PFE 102-1 for MMCC 200 exchanging data DD-memory access and/or subroutine calls therebetween, per FIG. 1. A similar table with complementary entries would reflect respective traffic for the second port, port B, or IN-B, slaved either to the same external processor, PFE 102-1 or to a separate external processor, i.e., optional processor 102-2.

A general overview of the table follows. The entity controlling the data of each table cell is shown under the column headings. Thus, the SD (col. 1) and the CMD (col. 2) are input by the user, PFE 102-1 of FIG. 1. All other table entries are controlled by MMCC 200, thereby relieving the user, PFE 102-1, of administrative overhead and also increasing bandwidth and efficiency of the user. As shown in the CMDs column (col. 2), memory accesses are interleaved with subroutine calls, as dictated by the needs of the user. Immediately upon receipt of the CMD at the input of the MMCC 200, the CMD is written in the output CMD queue (col. 8) for the same SD (col. 7) as implemented by CQOB 708A of FIG. 7 in SD-1 (not shown). Thus, the FIFO protocol regarding input commands and output results is preserved. A notable exception is when a CMD requires no output, such as WRITE command with no acknowledge required (no ack), as shown in row 6, as noted by "JJ" in col. 8, which shows 'skip' as an illustration of not reserving a slot in the output command queue. Memory scheduler (MEM SCHED) (col. 3) ignores CSUB CMDS (shown as '- - -'), while PE-THREAD (col. 4) executes those CSUB CMDS. The opposite is true for a memory access CMD, with the PE-THREAD ignoring the memory access CMD (shown as '- - -'), while the memory controller and scheduler execute them. The PE-THD (col. 4) indicates the processing engine and the thread on that PE that will execute the CMD. The sequence of instructions (col. 5) associated with a CMD is whatever instructions the user chooses, either as a default subroutine provided with the MMCC 200, or as upgraded by NPU software or by a third-party software provider with expertise in network algorithms. The subroutine instructions were loaded in IM 554-1 of FIG. 5B during initialization of the MMCC 200. The instructions are executed on respective cycles (col. 6) of the PE, assuming no stalls exist on the classic RISC protocol that executes one instruction per cycle, which equates to one execution for a given thread every 8 cycles for a PE configured with eight threads. The output scheduling domain (SD OUT) (col. 7) matches that of SD-IN (col. 1) for a given CMD.

A specific example in the table follows. Starting with a first example in the first row entry (row 1), the "queue full" status, noted as "HH", for that given SD of '0' prevents acceptance of a new CMD, so a notice is sent back to the user indicating this status, which will halt new CMDs being added to this SD until the queue opens again.

In another example, row 1 indicates a user-selected SD of '0' and a CMD of "EXACT MATCH" (with associated 'key' data, not shown). In response, the memory scheduler (col. 3) ignores the CMD as a non-memory CMD, and instead the AG 510-A, per FIG. 5A, receives the CMD and classifies it per the CMD Q /TYPE functional block 512A, whereupon AL 520 determines that PE-2 is eligible to process that type of CMD, on available thread 1 of 8 (THD-1/8, noted as 'FF'). Once relayed to PE-2 (alias of 550-1 in FIG. 5B) on line 215-1, decoder 558-1 decodes the CMD and points to a sequence of instructions, in IM 554-1 or CMD REG 552-1, starting with 'hash' and continuing on to 'extract, main mem load, extract . . . ' (col. 5) at cycles 2, 10, 18, 26, and 34 (col. 6), (respectively noted as 'GG') one instruction for every eight cycles of the PE 550-1.

Continuing with a next example in row 6, the user sends a CMD for a 'write (no ack)', which the memory controller 300 and ultimately the memory scheduler 310-1 of FIG. 3 decode and schedule for an access to a requested partition of memory (not shown). However, because the CMD does not require an acknowledge (ack), no entry is shown in col. 8 for output CMD queue, noted as "JJ".

In a next example, row 8 has a CMD of "CMD X", noted as "KK" which is linked by row 18 CMD 'exact match', noted as "LL". While default for CSUB CMDs and memory access CMDs is to not have the CMDs linked, but rather free flow through the redundant resources, it is possible to link CMDs as shown.

For the row 9 example of an 'exact match', the thread assigned is THD-2/2, shown by "MM" for PE-16. In this embodiment, PE-16 only has two threads assigned, while other PEs have 8 or 4 threads assigned. The determination of how many threads each PE has is a configurable parameter set by the user, depending on their need for processing power in any given type of CMD, for which PEs are slated. Thus, a two-threaded PE will return the results of the two CSUB CMDs faster than if they were being executed on an 8-thread PE, which is interleaved with six other CSUB CMDs.

Flow Path Illustration

Referring now to FIG. 10, a flow-path illustration 1000 is shown of multiple commands concurrently executing on the MMCC 200 to both access MM 400 and to call subroutines in the PE array 500, according to one or more embodiments. Four commands, CMD-1, CMD-2, CMD-3, and CMD-4 from a single scheduling domain are illustrated as having concurrent and independent pipeline execution on MMCC 200. Letters are sequentially arranged along each flow path, and from path to path, though the latter can be executed in parallel.

Beginning with the example of CMD-1, a read operation enters input interface 204 at point A and is reserved at ROB 700 simultaneously. It is then scheduled in memory controller 300 to access a read address in MM 400 at point B, and then the output data queued in ROB 700, and finally output as OP-1 from interface 224 at point C. Input interface 204 refers to SerDes 204-B, while output interface refers to SerDes 224-B, as shown in FIG. 2.

Next, for CMD-2, a CSUB CMD is received at interface 204 at point D, and is executed by custom logic 600 in PE array 500 at point E, which has a memory call instruction that is submitted through memory controller 300 and into MM 400 at point F, which read data is loaded directly back into PE array 500 at point G. At point G, the next CSUB code instruction executed in custom logic 600 is a particular data processing operation with another memory call instruction that is again submitted through memory controller 300 and into MM 400 at point H, which read data is similarly loaded directly back into PE array 500 at point I. This loop continues for two more iterations through points J, K, and finally finishes with a write into memory at point L. No data is output back to the host, so there is no flow path into the ROB 700 or output interface 224. CMD-2 illustrates the benefit of executing CMDs on the MMCC 200 with a main memory and coprocessor integrated on one chip, which is that all the iterations back and forth to fetch data from MM 400 and the processing of data in PE array 500 do not pass the chip interfaces 204, 224, which thereby substantially reduces latency for the CSUB code execution. The alternative would be to execute the instructions off-chip and then have to pass through an input and output interface of the PFE 102-1 and the DRAM 113 for every data fetch from memory. Because every memory access using the integrated PE array 500 of the present disclosure saves up to three orders of magnitude in cycle time, the benefits multiply with iterative calls to memory. Additionally, the processing and overhead savings to the off-chip processor PFE 102-1 by using the present disclosure are equally beneficial. The alternative would require PFE 102-1 to: schedule a memory fetch to DRAM 113 of FIG. 1; execute the CSUB code on the data at PFE 102-1; handle exceptions and interrupts associated with the data fetches and processing; and finally write the final data back into DRAM 113.

The internal access call of MMCC 200 has substantially less latency, e.g., up to three orders of magnitude fewer cycles, compared to an external access call. This is because a direct internal memory access, call by the present method for both read and write and RMW, bypasses the chip interface (I/F) and its associated operations and latency. In comparison, a similar conventional operation would require a discrete processor/coprocessor (PFE) chip to schedule a data fetch from a discrete and separate main memory chip. This model would incur the latency and power consumption of encoding/decoding, packetizing/unpacking, serializing/deserializing, and transmitting/receiving data across the interfaces of both chips Doing this repeatedly for each of the loops in the subroutine, i.e. compounds the problem. If the processor/coprocessor is also responsible for managing the conflict avoidance in scheduling a data fetch, then this consumes precious processor bandwidth while tasks that are more sophisticated wait. Additionally, driving large quantities of data over external lines, which are longer than an internal chip path, consumes power and subjects the data to noise.

CMD-3 is similar in that it is received at input interface 204 at point M, makes a CSUB code call at point N, executes an instruction that requires a data fetch, which is routed through memory controller 300 and into MM 400 at point O and which subsequently loads the data directly into PE array 500 at point P, thereby completing the CSUB code execution. Output results are communicated to ROB 700 and subsequently transmitted as OP-3 from output interface 224 at point Q. The OP-3 from CMD-3 is sequenced after OP-1 from CMD-1 to maintain the FIFO protocol, since they are in the same scheduling domain.

Finally, CMD-4 is a CSUB CMD received at input interface at point R, then executed in custom logic 600 in PE array 500 at point S, which output result is then scheduled through memory controller 300 to be written in MM 400, with no output being returned to the user.

Overall, substantial benefits arise from concurrently, independently, and interactively processing the memory access commands and the CSUB commands in the integrated main memory and coprocessor, respectively. Because both the main memory and coprocessor having multiple parallel redundant resources that autonomously execute their respective commands in a load-balanced manner, and because the transmitting of the output results is slaved to the sequence of the received input CMDs, the entire internal process is transparent to the user.

Chip Layout

Figure 11:
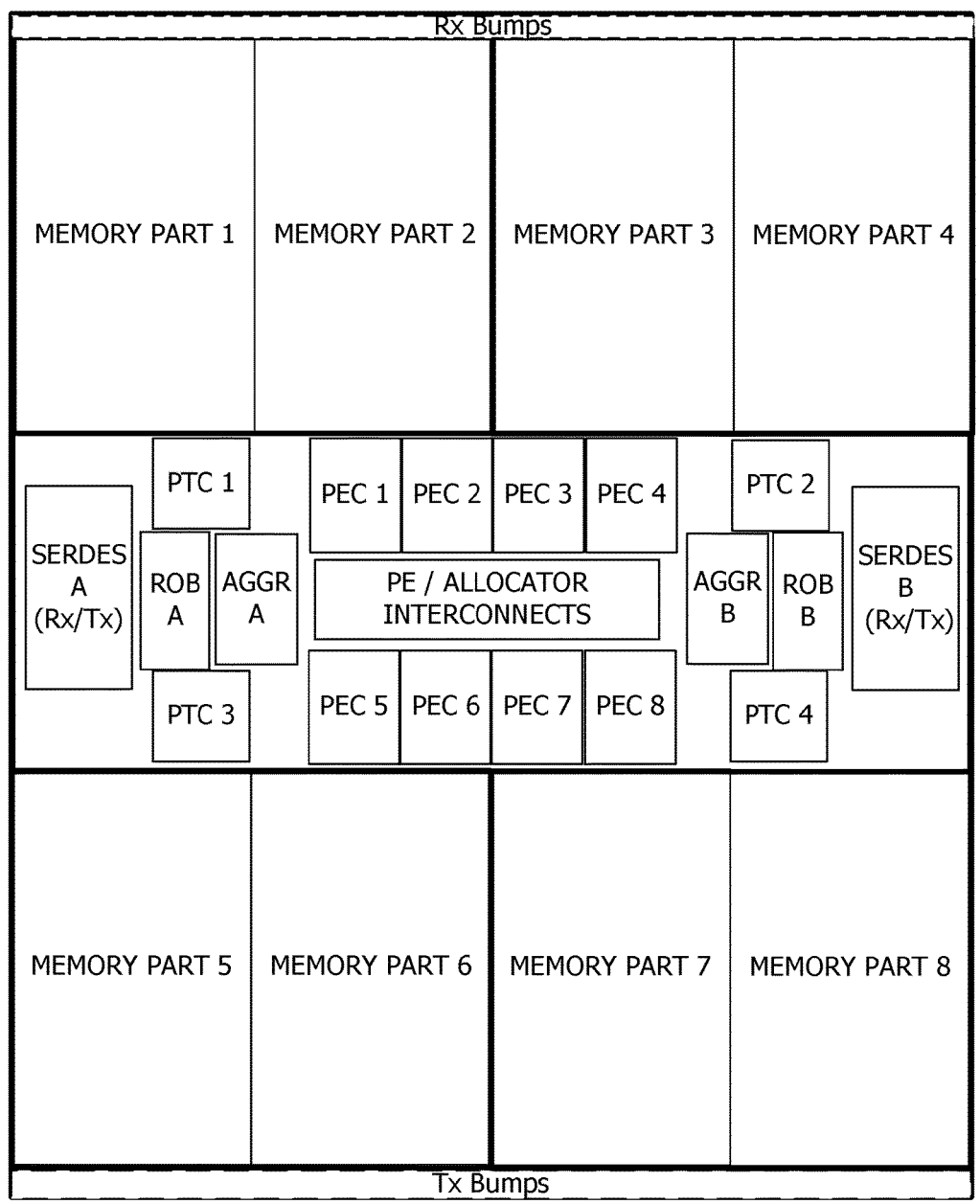
FIG. 11 is a layout diagram illustrating the placement and size of MM compared to the CP, according to one or more embodiments.

Referring now to FIG. 11, a layout diagram 1100 is shown illustrating the placement and size of MM compared to the CP, according to one or more embodiments. Eight memory partition blocks 0-7 occupy the outer portions of the die and consume approximately 60% of the chip area. However, any area size or partitioning scheme of memory can benefit from the advantages of the present disclosure, including memory areas above 30%, 40%, and 50% of the chip area. The portion of the memory partition block that is actually memory cells can range from 20% up, 30% up, or 40% and up, with the remainder of the block slated for logic, routing lines, sense amplifiers, decoders, memory access controller, redundant memory, buffers, etc. that support the actual reading and writing, as shown in FIG. 4.

Processing engines are disposed in two rows 1-4 on top, and row 5-8 on the bottom of the illustration, and separated by interconnects and allocator logic. Every PE is coupled directly to the single allocator and directly to each aggregator, and daisy-chained to each other. This high degree of direct interconnection minimizes muxing and control overhead, thereby minimizing latency. Partition controllers PTC 1, 2, 3, and 4 control memory partitions 1-2, 3-4, 5-6, and 7-8, respectively.

SerDes A and B blocks, having both transmit (Tx) and receive (Rx) drivers, are disposed on the horizontal centerline of the die, with the actual Rx and Tx ports, i.e., bumps of the flip chip, are disposed at the top edge and the bottom edge, respectively. This layout of the input and output interface provides advantages in routing that reduce noise and cross-coupling effects from interleaving the Rx and Tx lines. More detail on center SerDes and Segregated Rx and Tx lines is disclosed in: i) U.S. Pat. No. 8,890,332, issued Nov. 18, 2014, entitled "SEMICONDUCTOR CHIP LAYOUT WITH STAGGERED TX AND TX DATA LINES"; and ii) U.S. Pat. No. 8,901,747, issued Dec. 2, 2014, entitled "SEMICONDUCTOR CHIP LAYOUT", both of which are commonly assigned with the present application and both of which are hereby incorporated by reference in their entirety Alternative Embodiments References to methods, operations, processes, functions, systems, and apparatuses disclosed herein that are implementable in any means for achieving various aspects, and may be executed by an integrated circuit such as a memory device or via a machine-readable medium, e.g., computer readable medium, embodying a set of instructions that, when executed by a machine such as a processor in a computer, server, etc. cause the machine to perform any of the operations or functions disclosed herein. Functions or operations may include receiving, initializing, reserving, communicating, buffering, scheduling, aggregating, allocating, blocking, transmitting, executing, fetching, decoding, writing back, overwriting, deassigning, updating, tagging, storing, identifying, and the like. The memory device or similar electronic computing device manipulates and transforms data represented as physical (electronic) quantities within the devices' registers and memories into other data similarly represented as physical quantities within the devices' memories or registers or other such information storage, transmission, or display devices.

The term "machine-readable" medium includes any medium that is capable of storing, encoding, and/or carrying a set of instructions for execution by the computer or machine and that causes the computer or machine to perform any one or more of the methodologies of the various embodiments. The "machine-readable medium" shall accordingly be taken to include, but not limited to non-transitory tangible medium, such as solid-state memories, optical and magnetic media, compact disc and any other storage device that can retain or store the instructions and information. The present disclosure is also capable of implementing methods and processes described herein using transitory signals as well, e.g., electrical, optical, and other signals in any format and protocol that convey the instructions, algorithms, etc. to implement the present processes and methods.

The present disclosure is applicable to any type of network including the Internet, an intranet, and other networks such as local area network (LAN); home area network (HAN), virtual private network (VPN), campus area network (CAN), metropolitan area network (MAN), wide area network (WAN), backbone network (BN), global area network (GAN), an interplanetary Internet, etc.

Methods and operations described herein can be in different sequences than the exemplary ones described herein, e.g., in a different order. Thus, one or more additional new operations may be inserted within the existing operations or one or more operations may be abbreviated or eliminated, according to a given application, so long as substantially the same function, way and result is obtained.

The specific quantity of components in a series or span of redundant components described in the present disclosure is only by way of example, and not by way of limitation. Other embodiments include a greater or lesser number of components and one or many series within a cycle.

As used throughout this application, the word "may" is used in a permissive sense (i.e., meaning having the potential to), rather than the mandatory sense (i.e., meaning must). Similarly, the words "include," "including," and "includes" mean "including, but not limited to."

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component. Characteristic heuristics references imply systems.

The foregoing descriptions of specific embodiments of the present disclosure have been presented for purposes of illustration and description. They are not intended to be exhaustive or to limit or restrict the invention to the precise forms disclosed-even where only a single embodiment is described with respect to a particular feature. It is the intention to cover all modifications, alternatives, and variations possible in light of the above teaching without departing from the broader spirit and scope of the various embodiments. The embodiments were chosen and described to explain the principles of the invention and its practical application in the best manner, and to enable others skilled in the art to best utilize the invention and various embodiments with various modifications as are suited to the particular use contemplated. It is intended that the scope of the invention be defined by the Claims appended hereto and their equivalents.

We claim:

1. An integrated circuit (IC) comprising:
    an input interface for receiving an external command and optional external data;
    a main memory (MM) coupled to the input interface, the MM comprising:
        a plurality of memory cells configured to store data;
        a memory controller (MC) configured to execute an access command to one or more of the plurality of memory cells;
    a coprocessor (CP) coupled to the input interface and the MM, the coprocessor comprising:
        a processing engine (PE) coupled to the MM, wherein the processing engine is configured to execute a command for a subroutine call on data without requiring an interrupt;
    an output interface for transmitting data, the output interface coupled to the MM and the PE;
    a local data memory coupled to the PE;
    a plurality of registers coupled to the PE; and wherein:
        the local data memory and the plurality of registers are partitioned into a plurality of multi-threaded processing domains; and
        data stored in the local data memory and in the plurality of registers is located in a partition of the local data memory and a partition of the plurality of registers, respectively, that matches a multi-threaded processing domain of the data.

2. The IC of claim 1 wherein:
    the IC does not require an on-chip cache memory to temporarily store cached data from an external memory chip upon which cached data the PE executes an operation.

3. The IC of claim 1 wherein:
    the CP is configured to fetch data upon which the PE executes an operation;
    the data fetched by the CP is stored solely on the IC; and
    the data fetched by the CP is not cached on-chip from an external main memory.

4. The IC of claim 1 wherein:
    the execution of the access command to the MM and the execution of subroutine calls by the PE are performed concurrently and independently.

5. The IC of claim 1 wherein:
    the coprocessor is not required to process the access command prior to the MC executing the access command.

6. The IC of claim 1 wherein:
    the CP is configured to execute external commands for an EXACT MATCH, a LONGEST PREFIX MATCH (LPM), and a SEARCH operation on data in the MM; and
    the MM is configured to execute external commands or internal commands generated on-chip for a READ, a WRITE, and a READ/MODIFY/WRITE (RMW) operation on data with the MM.

7. The IC of claim 1 wherein:
    the CP is configured to execute instructions from an instruction memory for at least one function selected from a group of functions consisting of: hash, mask-plus-count (MPC), set-assign-compare (SAC), and error detection and correction (EDC).

8. The IC of claim 1 wherein:
    the input interface is coupled to the MM and to the PE in parallel in order to communicate the external command to the MM and to the PE in parallel.

9. The IC of claim 1 wherein:
    the CP is configured to execute a plurality of CMDs for network functions as requested by a packet forwarding engine (PFE) host; and
    the plurality of network function CMDs is a subset of a full set of commands required of the PFE for processing network packets.

10. The IC of claim 1 wherein:
    the PE is configured to execute a plurality of instructions;
    the instructions comprise neither an INTERRUPT nor a CACHE CONTROL instruction.

11. The IC of claim 10 wherein:
    an input buffer memory is configured to receive a plurality of commands from an external source according to an input sequence for a given scheduling domain; and
    an output buffer memory is configured to output a plurality of results in an output sequence for the given scheduling domain; and
    the input sequence for the given scheduling domain is the same as the output sequence for the given scheduling domain; and
    the input sequence and the output sequence are a first-in-first-out (FIFO) sequence.

12. The IC of claim 1 wherein:
    the input interface comprises a plurality of input ports;
    the output interface comprises a plurality of output ports; and
    each output port is slaved to one unique input port to form an input/output port pair.

13. The IC of claim 12, wherein:
    a first input port is configured to receive a command of a first type;
    a second input port is configured to receive a command of a second type; and wherein:
    a first command is received on a first input port;
    a second command is received on a second input port; and
    the first command and the second command are received concurrently;
    the first and second commands are of different types;
    the first command is received on the first input port from a first host;
    the second command is received on the second input port from a second host; and
    the first host and the second host are separate ICs.

14. The IC of claim 1 wherein:
    the IC is configured to implement a plurality of multi-threaded domains;
    the input interface and the output interface are configured for a first type of multi-threaded domain;
    the coprocessor is configured for a second type of multi-threaded domain; and at least two multi-threaded domains of the plurality of multi-threaded domains are independent from each other.

15. The IC of claim 1 further comprising:
a local data memory (LDM) coupled to the PE; and wherein:
the LDM has a memory capacity that is smaller that a memory capacity of the MM; and
a memory access speed by the PE to the LDM is faster than a memory access speed by the PE to the MM.

16. The IC of claim 1 further comprising:
a memory scheduler (MS) coupled to the MM and the PE; and wherein:
the MS is configured to:
receive an access CMD from an external source or from an internal source to access the MM; and
schedule the access CMD to the MM.

17. The IC of claim 1 further comprising:
a plurality of PEs coupled to the MM, wherein:
each of the plurality of PEs is configured to perform one or more auxiliary functions; and
at least two of the plurality of PEs are coupled in parallel to the MM.
each of the plurality of PEs is configured to execute a CMD independently from a balance of the plurality of PEs in the IC.

18. The IC of claim 17 further comprising:
a local data memory (LDM) coupled to the plurality PEs; and wherein:
data stored in the LDM is not stored in the MM and is not cached data from an off-chip memory.

19. The IC of claim 17 further comprising:
a plurality of PE clusters (PECs); and
a plurality of LDMs; and wherein:
each of the plurality of PECS comprises four PEs coupled to each other and at least a single LDM coupled to the four PEs;
the plurality of PECs is eight PECS; and
any of the PEs in any of the PECS can access data stored in any of the plurality of LDMs.

20. An integrated circuit (IC) comprising:
an input interface for receiving an external command and optional external data;
a main memory (MM) coupled to the input interface, the MM comprising:
a plurality of memory cells configured to store data; and
a memory controller (MC) configured to execute an access command to one or more of the plurality of memory cells;
a coprocessor (CP) coupled to the input interface and the MM, the coprocessor comprising:
a processing engine (PE) coupled to the MM, wherein the processing engine is configured to execute a command for a subroutine call on data without requiring an interrupt;
an output interface for transmitting data, the output interface coupled to the MM and the PE; and wherein:
the input interface comprises an input buffer memory;
the input buffer memory is partitioned into a plurality of coarse grain multi-threaded scheduling domains;
the output interface includes an output buffer memory;
the output buffer memory is partitioned into a plurality of coarse grain multi-threaded scheduling domains;
the scheduling domains of the input interface are paired with the scheduling domains of the output interface;
a scheduling domain ID is tagged to:
data stored in a given scheduling domain of the input buffer memory;
data accessed from the MM that is associated with a command (CMD) from one of the scheduling domains of the input buffer memory;
data processed by the PE that is associated with a CMD from one of the scheduling domains of the input buffer memory; and
data forwarded to the output buffer memory that is associated with a CMD from one of the scheduling domains of the input buffer memory.

* * * * *